United States Patent
Xu et al.

(10) Patent No.: US 12,511,544 B1
(45) Date of Patent: Dec. 30, 2025

(54) FEATURE-MAP THROUGHPUT DURING TRAINING PROCESS

(71) Applicant: Amazon Technologies, Inc., Seattle, WA (US)

(72) Inventors: Kun Xu, Austin, TX (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1210 days.

(21) Appl. No.: 17/037,254

(22) Filed: Sep. 29, 2020

(51) Int. Cl.
G06V 10/82 (2022.01)
G06F 13/28 (2006.01)
G06N 3/084 (2023.01)
H03M 7/30 (2006.01)

(52) U.S. Cl.
CPC ............. *G06N 3/084* (2013.01); *G06F 13/28* (2013.01); *G06V 10/82* (2022.01); *H03M 7/70* (2013.01)

(58) Field of Classification Search
CPC ........ G06N 3/084; G06F 13/28; G06V 10/82; H03M 7/70
See application file for complete search history.

(56) References Cited

U.S. PATENT DOCUMENTS

| | | | |
|---|---|---|---|
| 11,253,324 B1 * | 2/2022 | Bu | G06T 7/143 |
| 11,797,830 B2 * | 10/2023 | Gunnam | G06N 3/08 |
| 12,165,038 B2 * | 12/2024 | Lo | G06N 3/063 |
| 2018/0322383 A1 * | 11/2018 | Feng | G06N 3/04 |
| 2019/0340493 A1 * | 11/2019 | Coenen | G06N 3/08 |
| 2019/0392297 A1 * | 12/2019 | Lau | G06N 3/04 |
| 2020/0097802 A1 * | 3/2020 | Gudovskiy | G06N 3/063 |
| 2020/0111217 A1 * | 4/2020 | Yokoyama | G06N 3/047 |
| 2020/0151571 A1 * | 5/2020 | Wu | G06N 3/045 |
| 2020/0264876 A1 * | 8/2020 | Lo | G06N 3/063 |
| 2020/0342632 A1 * | 10/2020 | Frumkin | G06T 9/002 |
| 2021/0248747 A1 * | 8/2021 | Tang | G06N 3/045 |
| 2021/0279841 A1 * | 9/2021 | Liu | G06T 7/40 |
| 2021/0351789 A1 * | 11/2021 | Verrilli | H03M 7/3066 |
| 2022/0262002 A1 * | 8/2022 | Wang | G06V 10/454 |
| 2022/0414457 A1 * | 12/2022 | Nina Paravecino | G06N 3/08 |

* cited by examiner

*Primary Examiner* — Beau D Spratt
(74) *Attorney, Agent, or Firm* — Kilpatrick Townsend & Stockton LLP

(57) ABSTRACT

Systems and methods are provided to improve the memory throughput for storing and reading intermediate data computed by layers of a neural network during a training process. A compression operation can be performed by removing the zeros from the intermediate data and storing locations of the zeros before storing the intermediate data in the memory for a forward pass of the training process. The compressed data can be read from the memory for a backward pass of the training process and de-compressed by inserting zeros based on the stored locations. Additionally, a transpose operation can be performed before compression as a first atomic operation, or after de-compression as a second atomic operation.

18 Claims, 11 Drawing Sheets

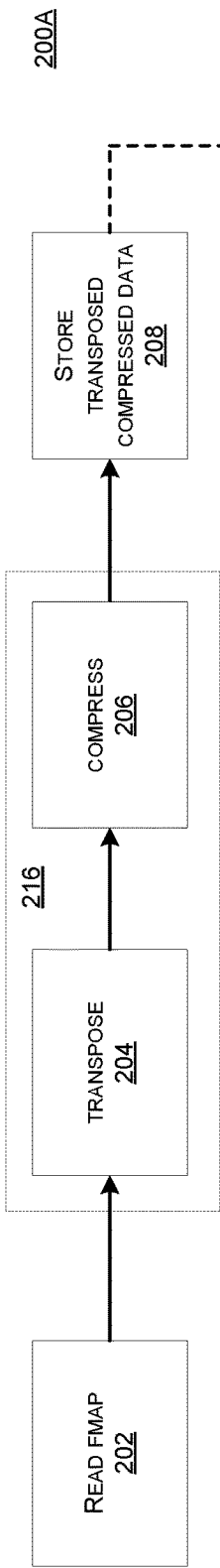
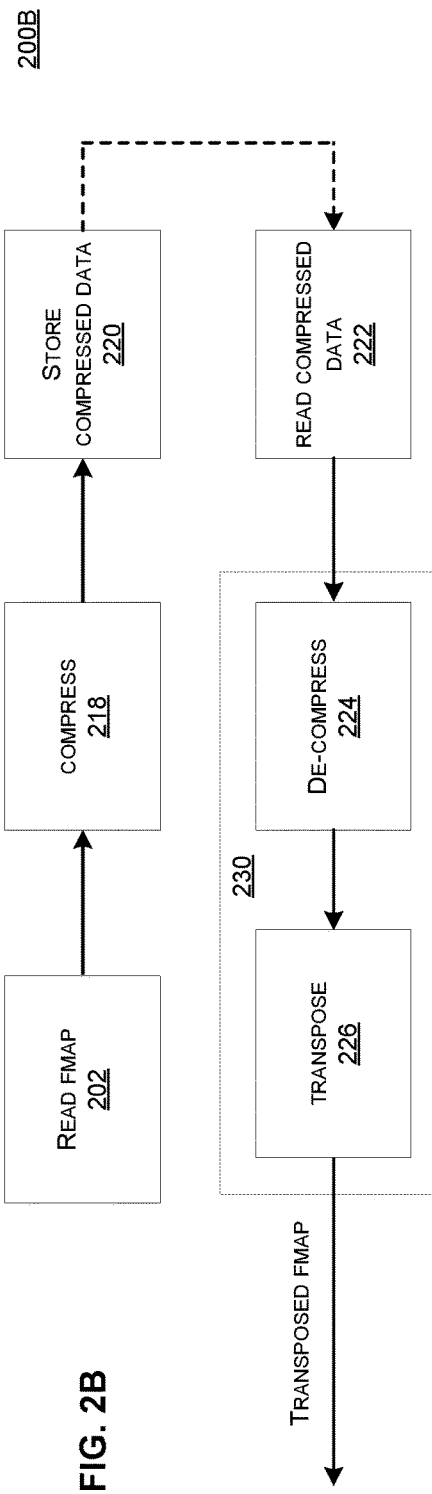
FIG. 2A
FIG. 2B

FEATURE-MAP THROUGHPUT DURING TRAINING PROCESS

BACKGROUND

Artificial neural networks, which are often simply referred to as neural networks, are computing systems with architectures based on biological neural networks. Neural networks can be trained, using training data, to learn how to perform a certain computing task, such as speech synthesis, image classification, or object detection. A neural network may include multiple layers of processing nodes. Each processing node in a layer can perform computations on input data, generated by processing nodes in the preceding layer to generate output data. For example, a processing node may perform a set of arithmetic operations, such as multiplications and additions, to generate an intermediate output, or perform post-processing operations on the intermediate output to generate a final output. A neural network may include thousands, or more, of processing nodes and millions, or more, of parameters.

Training neural networks can involve iterations of forward propagation and backward propagation operations. Generally, intermediate data generated during forward propagation operations is stored in a main memory for re-use during backward propagation operations. Certain neural networks may demand high throughput to the main memory for writing or reading this intermediate data. Accessing the main memory can impact the training performance of neural networks, especially for neural networks with a large number of layers.

BRIEF DESCRIPTION OF THE DRAWINGS

Various embodiments in accordance with the present disclosure will be described with reference to the drawings, in which:

FIG. 2A illustrates a process flow which can be used to improve memory throughput by performing a first atomic operation during a forward pass of a training process;

FIG. 2B illustrates a process flow which can be used to improve memory throughput by performing a second atomic operation during a backward pass of the training process;

DETAILED DESCRIPTION

Figure 1A:
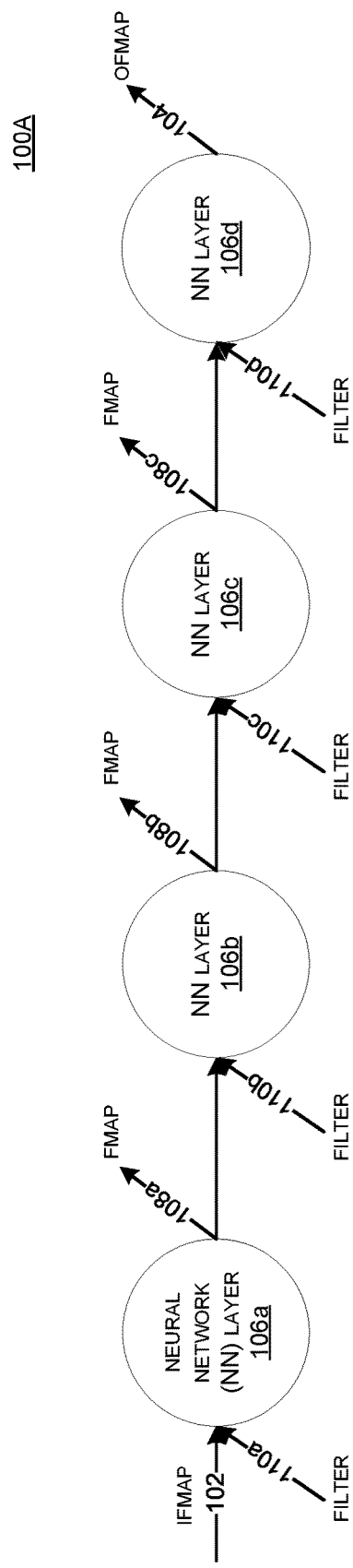
FIG. 1A illustrates a process flow, which can be used to describe forward propagation operations for a training process of an example neural network.

Training a neural network can involve feeding a neural network model with an example training dataset and tuning its parameters to perform a certain task (e.g., object classification, image recognition, or speech processing). The architecture of a neural network may include an input layer, an output layer, and a number of intermediate layers, often referred to as hidden layers. Each layer can execute a computation on the outputs of the previous layer, with the last layer (the output layer) providing a final result. As an example, a convolutional neural network (CNN) may include one or more of a convolutional layer, an activation layer, a pooling layer, a fully connected layer, and/or a normalization layer.

As part of the training process, forward propagation operations can be performed on the training input data, using a filter at each neural network (NN) layer, to generate training output data at a highest level NN layer. The forward propagation operations can represent different stages of extraction and processing of information from the training input data using the filter (e.g., a set of weights). The training output data can be compared with reference output data that supports a particular decision. A set of gradients can be generated based on, for example, differences between the training output data and the reference output data. For example, a first NN layer may receive the training input data, then combine the training input data with the weights to generate a first intermediate data for the first NN layer. The first NN layer may then propagate the first intermediate data to a second NN layer. The second NN layer may perform another forward propagation operation on the first intermediate data from the first NN layer to generate a second intermediate data, and then propagate the second intermediate data to a third NN layer, and so on.

The set of weights for the neural network can be generated and/or updated by the training process to improve the likelihood of the neural network generating a more accurate decision. An example training process can use a gradient descent scheme. As part of the training process, each NN layer can perform a backward propagation operation to adjust the set of weights at each NN layer. The backward propagation operations can start from the highest NN layer and end at the first NN layer. The set of weights at each NN layer can be adjusted to complete one iteration of the training process. Specifically, each NN layer can receive gradients data and compute, in a backward propagation operation, a gradient filter based on applying the filter to the gradient data in similar mathematical operations as the forward propagation operation. Each NN layer can adjust the filter based on the gradient filter. The training process can be repeated for the same training input data for a number of iterations until a loss objective (e.g., a threshold input data gradient) can be achieved.

The input data, intermediate data, output data, and the filter can be tensors or multi-dimensional vectors comprising data elements. For example, a matrix is a two dimensional tensor. A transpose operation is generally performed to maintain proper dimensionality of the tensors for the backward propagation operations. The transpose operation can swap rows and columns of a given tensor. For example, the set of weights used by the forward propagation operations is generally transposed for the backward propagation operations. Similarly, the intermediate data computed by the forward propagation operations is also transposed for the backward propagation operations.

Generally, intermediate data computed by the forward propagation operations is stored in a main memory to be re-used by the backward propagation operations for weight adjustment. This intermediate data can be read from the main memory for the backward propagation operations to avoid duplicate computations. In most cases, the training dataset may be too large to pass through the neural network at once, and is generally divided into batches. The amount of intermediate data to be stored in the main memory may depend upon the number of neural network layers and the batch size. Thus, reading this intermediate data from the main memory for each neural network layer can impact the training performance, which may be worse for a neural network with a higher number of layers.

Additionally, an output of a neural network layer may pass through an activation function before feeding in as an input to the next layer. As an example, a rectified linear activation function (ReLu) can output the input directly if the input has a positive value, or output a zero value. Thus, the intermediate data computed by the neural network layer may include a high percentage of zero values after passing through the activation function. Storing these zero values in the main memory during the forward propagation operations, and reading them back for the backward propagation operations can waste memory throughput during the training process.

Certain embodiments can provide high throughput for memory accesses by compressing or removing zeros from the intermediate data computed by the forward propagation operations before storing the intermediate data in the main memory. Location of the zeros in the intermediate data can be stored along with the intermediate data. For the backward propagation operations, the compressed intermediate data can be read back and de-compressed by restoring each removed data element into the intermediate data based on the stored location. Embodiments can further improve the throughput by performing a transpose operation and a compression operation on the intermediate data as an atomic operation for a forward pass, and/or by performing a de-compression operation and a transpose operation as an atomic operation for a backward pass on the compressed intermediate data. The atomic operation can allow the transpose operation to be performed with a compression or a de-compression operation using a single command, and without storing the intermediate results in the main memory. The throughput savings may depend upon a compression rate determined based on the percentage of zeros in the intermediate data.

In certain embodiments, a neural network processor may provide computing resources to perform various operations for the training process, including the forward and backward propagation operations. A reduction engine coupled to the neural network processor can perform the compression, de-compression, and transpose operations. The reduction engine can also be part of a direct memory access (DMA) controller. The reduction engine may be capable to perform the atomic operations to improve the memory throughput.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1B:
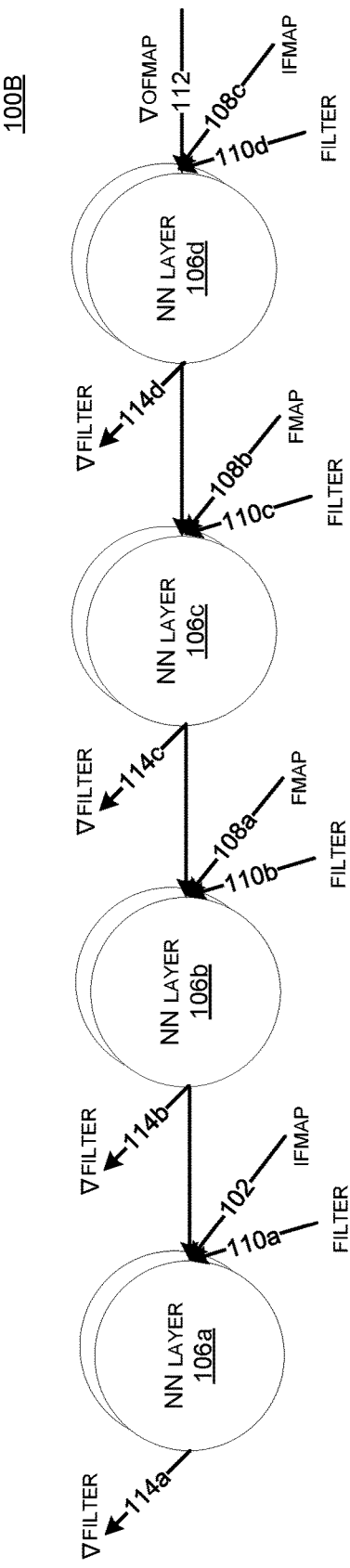
FIG. 1B illustrates another process flow, which can be used to describe backward propagation operations for the training process.

FIG. 1A illustrates a process flow 100A, which can be used to describe forward propagation operations for a training process of an example neural network. FIG. 1B illustrates a process flow 100B, which can be used to describe backward propagation operations for the training process.

FIGS. 1A and 1B show neural network (NN) layers 106a, 106b, 106c, and 106d of a neural network. In certain examples, the neural network can be part of a convolutional neural network (CNN), and the NN layers 106a-106d can be convolutional layers. Note that a CNN can comprise tens, hundreds, thousands, or even a higher number of layers. However, for explanation purposes, only a small set of layers is shown. A convolutional layer may convolve a low-dimensional filter with high-dimensional input data to generate output data. The output data may include features extracted from the input data using the filter based on the activation of the node.

Each input data may be represented by a tensor with a height "H" and a width "W." Each filter may be represented by a tensor with a height "R" and a width "S." A set of "C" filters can be applied on "C" different input data or channels for a batch size of "N" and summed together to generate the output data. This process may be repeated "M" times to generate "M" different output data.

The convolutional layer may be followed by an activation layer or a pooling layer. An activation layer may be used to apply non-linearity to the output of the convolutional layer, and the pooling layer may be used to spatially reduce the size of the convolution output. A fully-connected layer can be used at the end of the CNN to capture high-level features. A forward propagation operation at an NN layer may include multiplication and summation computations between the input data and a set of weights for that layer, followed by an activation function to generate output data. The output data can then propagate to the next NN layer as an input to the forward propagation operation at that layer.

As shown in FIG. 1A, the NN layer 106a may receive an ifmap 102, multiply the ifmap 102 with a filter 110a, and then sum the products to generate an fmap 108a. The filter 110a can be applied using a sliding window convolution process on the ifmap 102 to generate different elements of the fmap 108a. The ifmap 102 may be part of the training input data. Batching may be used to repeat the whole process for different sets of ifmaps belonging to the training input data. The NN layer 106a may propagate the fmap 108a to the NN layer 106b. The NN layer 106b may perform another forward propagation operation on the fmap 108a using a filter 110b to compute an fmap 108b, and propagate the fmap 108b to the NN layer 106c. The NN layer 106c may perform another forward propagation operation on the fmap 108b using a filter 110c to compute an fmap 108c, and propagate the fmap 108c to the NN layer 106d. The NN layer 106d may perform another forward propagation operation on the fmap 108c using a filter 110d to generate an output fmap (ofmap) 104. A decision can then be made based on the ofmap 104. The filters 110a, 110b, 110c and 110d can be the same or different based on the application of the neural network.

As part of the training process, each NN layer can then perform a backward propagation operation to fine tune the set of weights at each NN layer. Derivatives of the loss function can be computed according to the weights using the known "derivative-chain-rule," which can be expressed as walking the neural network in the reverse order for the backward propagation. A data gradient can be computed using a loss gradient operation by comparing the output data of the highest NN layer against the reference output data.

The data gradient can be used to measure a rate of difference between the output data and the reference output data with respect to each data element of the output data. In some examples, an objective of the training is to minimize the difference between the output data and the reference output data such that the data gradient becomes close to zero. As an example, a gradient ofmap 112 can be computed based on the ofmap 104 and the reference output data (not shown).

For the training process, forward propagation operations and the backward propagation operations can be alternated to update neural network model parameters using gradients computed by the backward propagation operations. Additionally, the filters and the fmaps may be transposed for the backward propagation operations to maintain the proper dimensionality of the computations. For example, the weights can be loaded in the C[RSM] format during the forward propagation operations and are transposed to be in the M[RSC] format for the backward propagation operations. Similarly, the fmaps for each layer can be computed and stored in the main memory in the C[NHW] format during forward propagation operations and can be transposed to be in the N[CHW] format for the backward propagation operations. Other formats can be used based on the implementation.

As shown in FIG. 1B, the backward propagation operations can start from the highest NN layer 106d and end at the first NN layer 106a. The intermediate fmaps 108a-108c computed by the forward propagation operations can be re-used in the backward propagation operations to avoid duplicate computations for the training process. A backward propagation operation at an NN layer can be based on the weights of that NN layer, a data gradient input to that NN layer, as well as the input to the forward propagation operation of that NN layer. For example, the backward propagation operation can perform multiplication and summation computations on the input of each NN layer to generate an output data gradient and a filter gradient. The output data gradient can be forwarded to the next lower NN layer as an input to the backward propagation operation in that layer, whereas the filter gradient can represent changes to be applied to the weights at that NN layer. Specifically, the highest NN layer 106d can receive the gradient ofmap 112 and compute, in a backward propagation operation, a gradient filter 114d based on applying the filter 110d to the ifmap 108c in similar mathematical operations as the forward propagation operation. The highest NN layer 106d can adjust the filter 110d based on the gradient filter 114d.

Similarly, the NN layer 106c, the NN layer 106b, and the NN layer 106a can compute a respective gradient filter 114c, 114b, and 114a based on applying the respective filters 110c, 110b, and 110a on the fmaps 108b, fmap 108a, and the ifmap 102. The respective filter 110d, 110c, 110b, or 110a at each NN layer 106d, 106c, 106b, or 106a can be adjusted to complete one iteration of the training process. The training process can be repeated for the same training data for a number of iterations until a loss objective (e.g., a threshold input data gradient) can be achieved.

Generally, the intermediate fmaps computed by the forward propagation operations are stored in a main memory during the forward propagation operations and read back from the main memory to be re-used for the backward propagation operations. For neural networks, particularly for the CNNs, high throughput to the main memory for writing and reading the intermediate fmaps is desirable. However, in most instances, the fmaps tend to include a high percentage of zeros due to passing through an activation function. In such instances, writing and reading a high percentage of zeros can waste memory throughput.

Certain embodiments can provide high throughput for memory accesses by compressing or removing zeros from the intermediate fmaps (e.g., fmaps 108a-108c) computed by the forward propagation operations before storing the fmaps in the main memory for re-use. Locations of the zeros in the fmaps can be saved in a compression header. The compression header can be stored in the main memory along with the fmaps. For the backward propagation operations, the compressed fmaps can be read and de-compressed by inserting zeros back into the fmaps based on the compression header. A transpose operation can be performed on the fmaps before compression in a forward pass of the training process, or after de-compression in a backward pass of the training process. Embodiments can further improve the throughput by performing a transpose operation and a compression operation as an atomic operation for the forward pass, or by performing a de-compression operation and a transpose operation as an atomic operation for the backward pass.

In some implementations, a first atomic operation can be performed to transpose and compress the fmaps to generate transposed compressed fmaps for a forward propagation operation or pass. The transposed compressed fmaps can be read from the memory and de-compressed to generate de-compressed transposed fmaps for a backward propagation operation or pass. The first atomic operation can be performed using a single command and without storing the transposed fmaps in the main memory after performing the transpose operation on the fmaps and before performing the compression operation. In some implementations, the fmaps can be compressed to generate compressed fmaps for a forward propagation operation or pass. The compressed fmaps can be read from the memory and a second atomic operation can be performed to de-compress and transpose the fmaps to generate transposed de-compressed fmaps for a backward propagation operation or pass. The second atomic operation can be performed using a single command and without storing the de-compressed data in the main memory after performing the de-compression operation and before performing the transpose operation. The first atomic and the second atomic operations are further described with reference to FIGS. 2A and 2B.

Figure 3A:
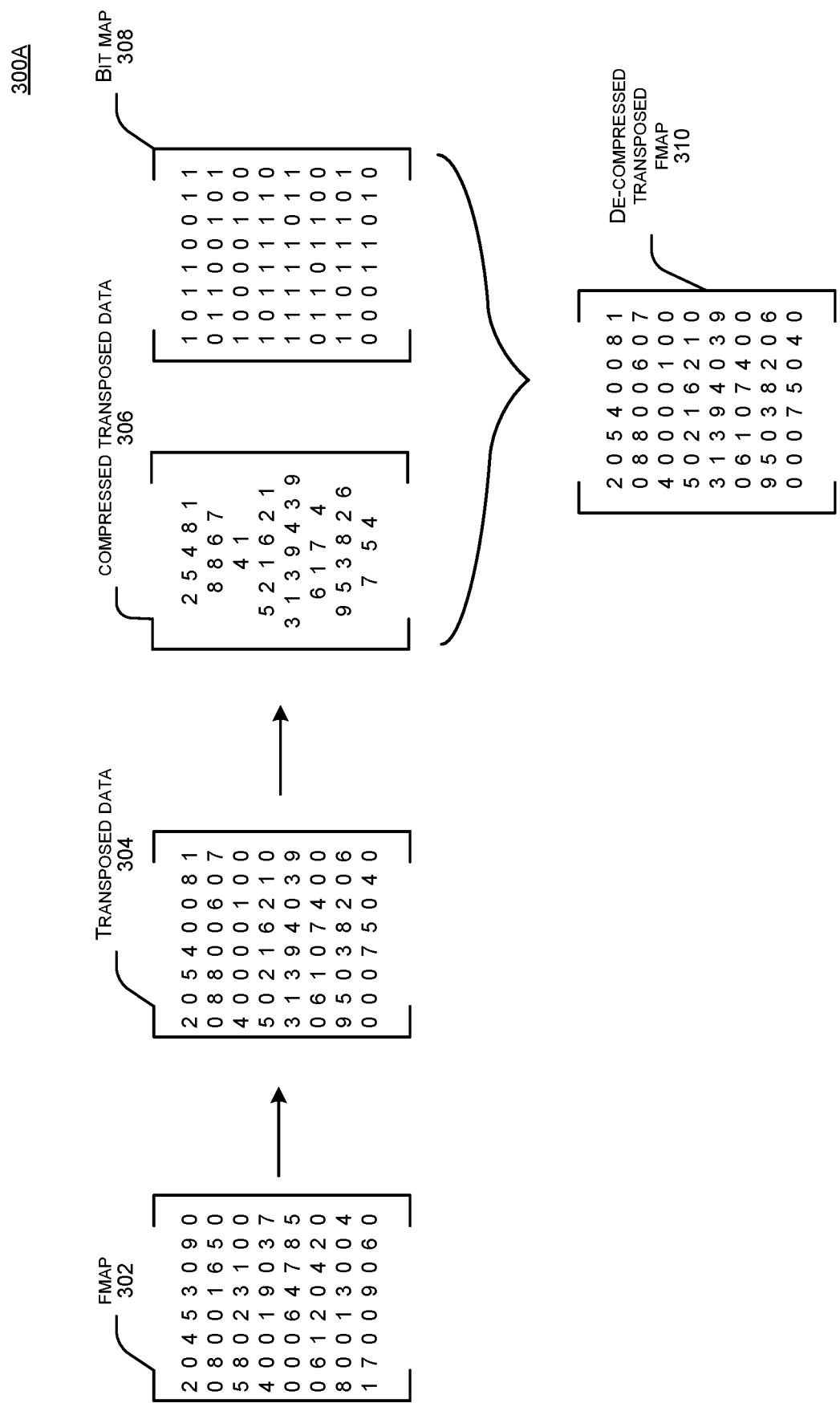
FIG. 3A illustrates example values for the process flow with the first atomic operation.

FIG. 2A illustrates a process flow 200A, which can be used to improve memory throughput by performing a first atomic operation during a forward pass, according to some embodiments. FIG. 3A shows example values according to the process flow 200A.

In step 202, an fmap can be read from the main memory. The fmap can be the intermediate data computed by an NN layer as a result of a forward propagation operation. For example, the fmap can be the fmap 108a, 108b, or 108c as discussed with reference to FIG. 1A.

In some implementations, the fmap can be similar to an example fmap 302 of a size 8x8 as shown in FIG. 3A. Each data element in the 8×8 fmap 302 can be, for example, a 16-bit floating point number.

In step 204, a transpose operation can be performed on the fmap 302 to generate transposed data 304. The transposed data 304 may include columns of the fmap 302 as rows, and rows of the fmap 302 as columns.

In step 206, a compression operation can be performed on the transposed data 304 to generate compressed transposed data 306 by removing zeros from the transposed data 304. Locations of the removed zeros can be stored in a compression header as a bit map 308 or using another suitable mechanism. In the example bit map 308 shown in FIG. 3A, a value of "1" is stored for each data element of the transposed data 304 with a non-zero value, and a value of "0" is stored for each data element of the transposed data 304 with a zero value. The transpose and the compression operations can be performed atomically using a first atomic operation 216 based on a single command. For example, the compressed transposed data 306 can be written into the main memory using a single instruction without having to first store the transposed data 304 in the main memory, and then perform the compression on the stored data.

In step 208, the compressed transposed data 306 can be stored in the main memory to be re-used for the backward pass. The bit map 308 can also be stored along with the compressed transposed data 306 which can be used for de-compression. The steps 202, 216, and 208 can be performed for the fmaps generated by each NN layer (e.g., the NN layers 106a-106d) for the respective forward propagation operations. In the example shown in FIG. 3A, storing the transposed data 304 including the zero values in the main memory can take 64 data elements x 16 bits=1,024 bits, whereas storing the compressed transposed data 306 along with the bit map 308 takes only 656 bits (37 non-zero data elements x 16 bits, plus 64-bits for the bit map). Thus, storing the compressed fmaps as compared to un-compressed fmaps can reduce the number of memory accesses which may be needed for the backward pass.

In step 210, the compressed transposed data 306 can be read from the main memory for the backward propagation operations. The bit map 308 can also be read from the main memory along with the compressed transposed data 306. As shown in FIG. 1B, the fmaps 108a-108c computed by the forward propagation operations can be re-used by the respective NN layers 106b-106d to adjust the weights for the training process.

In step 212, a de-compression operation can be performed to de-compress the compressed transposed data 306 to generate de-compressed transposed fmap 310 using the bit map 308. The decompression operation can include inserting zeros back into the compressed transposed data 306 based on the stored location of those zeros in the bit map 308. The de-compressed transposed fmap 310 is same as the transposed data 304. Throughput savings can be determined based on a compression rate (e.g., ratio between size of the compressed transposed data 306 and size of the fmap 302). The throughput savings may be more for a higher number of zero data elements in the fmap 302. Note that a small number of bits may be used for storing the bit map 308, which can offset a fraction of the throughput savings.

Figure 3B:
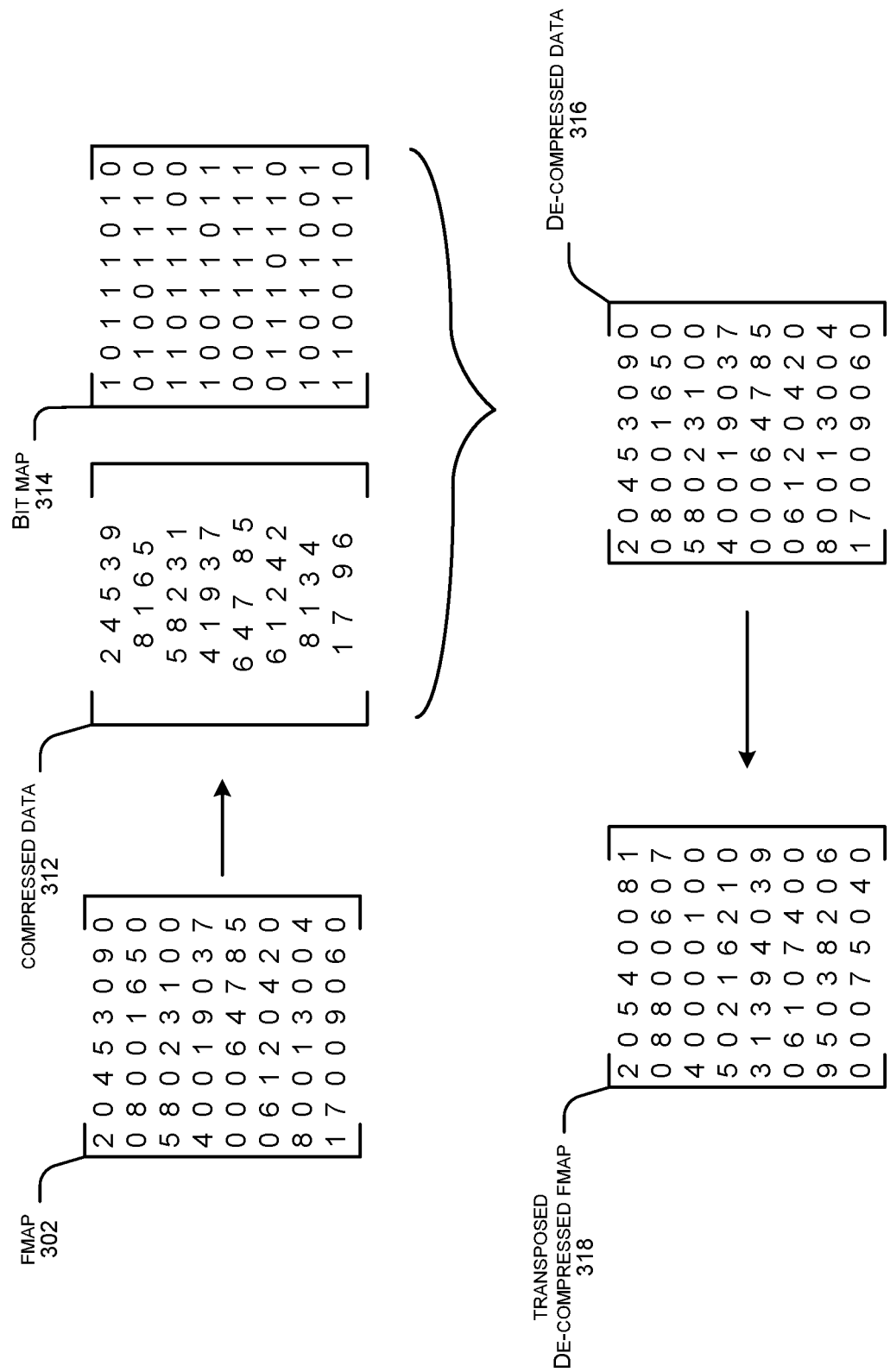
FIG. 3B illustrates example values for the process flow with the second atomic operation.

FIG. 2B illustrates a process flow 200B, which can be used to improve memory throughput by performing a second atomic operation during a backward pass, according to some embodiments. FIG. 3B shows example values according to the process flow 200B.

In the step 202, the fmap 302 can be read from the main memory as discussed with reference to FIG. 2A.

In step 218, a compression operation may be performed on the fmap 302 to generate compressed data 312 by removing zeros from the fmap 302, as shown in FIG. 3B. Locations of the removed zeros can be stored in a compression header as a bit map 314 or using another suitable mechanism. In the example bit map 314 shown in FIG. 3B, a value of "1" is stored for each data element of the compressed data 312 with a non-zero value, and a value of "0" is stored for each data element of the compressed data 312 with a zero value.

In step 220, the compressed data 312 can be stored in the main memory to be re-used for the backward pass. The bit map 314 can also be stored along with the compressed data 312 which can be used for de-compression. The steps 202, 218, and 220 can be performed for the fmaps generated by each NN layer (e.g., the NN layers 106a-106d) for the respective forward propagation operations. Storing the compressed fmaps as compared to un-compressed fmaps can reduce the number of memory accesses which may be needed for the backward pass.

In step 222, the compressed data 312 can read from the main memory for the backward propagation operations. The bit map 314 can also be read from the main memory along with the compressed data 312. As shown in FIG. 1B, the fmaps 108a-108c computed by the forward propagation operations can be re-used by the respective NN layers 106b-106d to adjust the weights for the training process.

In step 224, a de-compression operation can be performed to de-compress the compressed data 312 using the bit map 314 to generate de-compressed data 316. The decompression operation can include inserting zeros back into the compressed data 312 based on the stored location of those zeros in the bit map 314.

In step 226, the de-compressed data 312 can be transposed to generate transposed de-compressed fmap 318. The de-compression and the transpose operations can be performed atomically using a second atomic operation 230 based on a single command. For example, the transposed de-compressed fmap 318 can be generated by transposing the de-compressed data 316 without having to first store the de-compressed data 316 in the main memory. The transposed de-compressed fmap 318 is same as the transposed fmap 302.

In certain embodiments, a neural network processor can include computing resources to perform the operations of a training process including forward propagation operations, backward propagation operations, weights adjustment operations, etc. The first atomic operation and the second atomic operation can be performed using a reduction engine which may be internal or external to the neural network processor. The reduction engine may be capable of performing a transpose operation followed by a compression operation as the first atomic operation, and/or a de-compression operation followed by a transpose operation as the second atomic operation. In certain embodiments, the reduction engine can be part of a DMA engine. For example, the DMA engine may be capable of performing a DMA operation as well as performing the first and second atomic operations. In other embodiments, the reduction engine can be used with or without a DMA engine. This is further explained with reference to FIG. 4.

Figure 4:
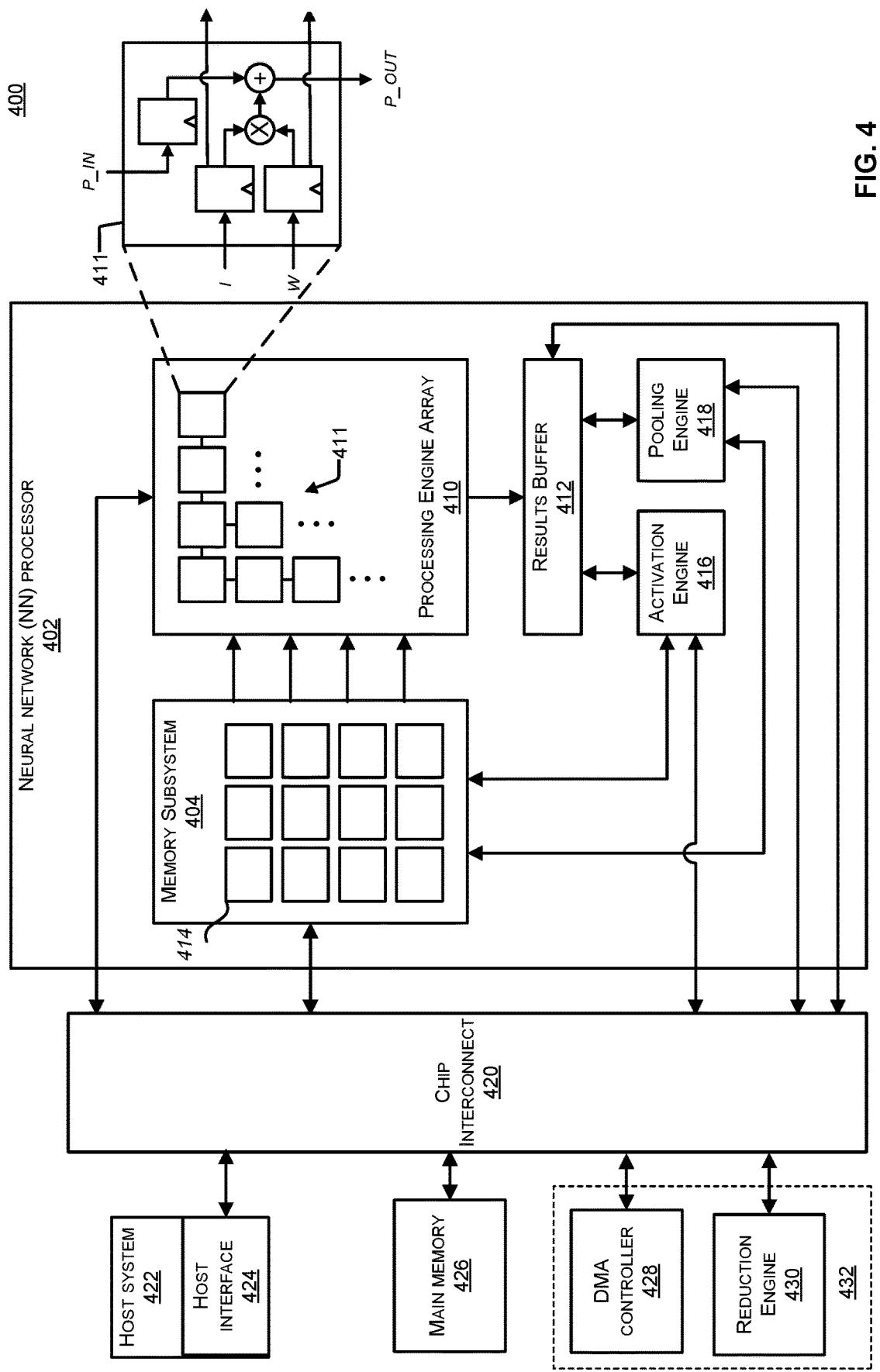
FIG. 4 illustrates an apparatus comprising an example neural network processor and a reduction engine that may be used to implement certain embodiments.

FIG. 4 illustrates an apparatus 400 comprising an example neural network processor 402 and a reduction engine 430 that may be used to implement certain embodiments. The neural network processor 402, reduction engine 430 and/or other components of the apparatus 400 can be implemented using an integrated circuit. The apparatus 400 may be part of a computer system or a server. The apparatus 400 can be used to provide computing resources for training a neural network model according to certain embodiments. The neural network model may be trained for data processing applications, such as an image recognition service, text-based data processing (e.g., processing of search queries), audio or video data processing, among others. The neural network processor 402 may be coupled to a host interface 424, a main memory 426, a direct memory access (DMA) controller 428, and the reduction engine 430 via a chip interconnect 420. The chip interconnect 420 may be based on an Advanced extensible Interface (AXI), advanced peripheral bus (APB), Advanced Micro controller Bus Architecture (AMBA), AMBA High-performance Bus (AHB), or another suitable bus protocol.

The host interface 424 may be configured to enable communication between a host system 422 and the neural network processor 402. For example, the host interface 424 may be used to transfer data and instructions related to a training process of the neural network model. The host interface 424 may include a Peripheral Component Interconnect (PCI) interface, or any suitable interface for communicating with the host system 422.

The host system 422 may be configured to generate instructions to be executed by the neural network processor 402, DMA controller 428, or the reduction engine 430. In some implementations, the instructions may be in the form of compiled code. For example, the host system 422 may generate computer code which can be compiled offline and stored in the main memory 426. The instructions may be executed by the neural network processor 402 to perform operations for the training process of the neural network model, including forward propagation operations and backward propagation operations. In certain embodiments, the instructions may include instruction(s) for the neural network processor 402 to perform convolution operations to generate the fmaps using a neural network model. The compiled code may include a first set of instructions for performing a first atomic operation or a second set of instructions for performing a second atomic operation by the reduction engine 430.

The main memory 426 may be configured to store the instructions and data used for training the neural network model. For example, the main memory 426 may be used to store training data sets (e.g., ifmaps), and weights (e.g., filters) received from the host system 422. The ifmaps and filters can be tensors of suitable shapes. The main memory 426 may also be configured to store outputs of the neural network processor 402 (e.g., intermediate fmaps and ofmaps) for the forward propagation operations that can be used by the neural network processor 402 for the backward propagation operations. The main memory 426 may include any suitable memory, e.g., dynamic random access memory (DRAM), synchronous DRAM (SDRAM), double data rate DRAM (DDR DRAM), storage class memory (SCM), and flash memory.

The DMA controller 428 may be configured to perform DMA operations to transfer data between the neural network processor 402 and the main memory 426, or between the host system 422 and the main memory 426. For example, as discussed above, the host system 422 can provide the instructions, ifmaps, and the weights for the training process to be stored in the main memory 426. The host system 422 can provide the memory addresses for the stored instructions, ifmaps, and the weights to the neural network processor 402 (e.g., in the form of memory descriptors). The neural network processor 402 can then obtain the stored instructions, ifmaps, and the weights from the main memory 426 based on the memory addresses provided by the host system 422. The neural network processor 402 can also store the results of computations (e.g., fmaps and ofmaps) in the main memory 426.

The reduction engine 430 can be configured to perform various operations based on a command received from the host system 422. The reduction engine 430 may include circuitry to perform operations including a compression operation, de-compression operation, transpose operation, or a combination thereof. For example, the reduction engine 430 may be configured to compress the fmaps computed by the forward propagation operations, and de-compress the compressed fmaps for the backward propagation operations to improve the memory throughput by reducing the amount of data to be written and read from the main memory 426. The reduction engine 430 can be further configured to transpose the fmaps before compression or after de-compression to be used by the backward propagation operations.

In certain embodiments, the reduction engine 430 can determine whether a first atomic operation or a second atomic operation is to be performed based on a command. For example, the host system 422 can provide a single command to be executed by the reduction engine 430 to perform the combined transpose and compression operations as the first atomic operation, or another command for the reduction engine 430 to perform the combined de-compression and transpose operations as the second atomic operation. The reduction engine 430 can be configured to transpose and compress the fmaps as the first atomic operation for the forward propagation operations, or de-compress and transpose the fmaps as the second atomic operation to provide the transposed fmaps to the neural network processor 402 for the backward propagation operations. In most systems, the transpose operation and the compression/de-compression operations are performed by separate engines and therefore the intermediate data computed by one engine has to be stored in the main memory 426 to be used by the other engine which can impact the memory throughput. Certain embodiments can improve the memory throughput by performing the transpose and the compression/de-compression operations using the same reduction engine 430 without storing the intermediate data in the main memory 426.

For example, based on a first command, the reduction engine 430 may be capable to transpose the fmaps computed by the forward propagation operations, store the transposed fmaps in a local memory, compress the transposed fmaps, and store the compressed transposed fmaps in the main memory 426. Based on a second command, the reduction engine 430 may read the compressed transposed fmaps from the main memory 426 and de-compress them to be re-used for the backward propagation operations by the neural network processor 402. The first command and the second command can be part of the first set of instructions. The first set of instructions may include additional instructions for the reduction engine 430 to generate a compression header based on a respective location of each data element having a zero value in the transposed fmaps, and store the compression header along with the compressed transposed fmaps. The first set of instructions may include a first descriptor for the first atomic operation. Similarly, based on a third command, the reduction engine 430 may be capable to compress the fmaps computed by the forward propagation operations, and store the compressed fmaps in the main memory 426. Based on a fourth command, the reduction engine 430 may be capable to read the compressed fmaps from the main memory 426, de-compress the fmaps, store the de-compressed fmaps in the local memory, and transpose the de-compressed fmaps to be re-used for the backward propagation operations by the neural network processor 402. The third command and the fourth command can be part of the second set of instructions. The second set of instructions may include additional instructions for the reduction engine 430 to generate the compression header based on a respective location of each data element having a zero value in the fmap, and store the compression header along with the compressed fmaps. The second set of instructions may include a second descriptor for the second atomic operation.

In certain embodiments, the DMA controller 428 and the reduction engine 430 can be part of a DMA engine 432. For example, the DMA engine 432 may be capable to perform the DMA operations as well as the compression, de-compression and transpose operations performed by the reduction engine 430. The host system 422 can provide different commands to the DMA engine 432 as part of the instructions to perform different operations including a DMA transfer, first atomic operation, second atomic operation, transpose operation, compression operation, or a de-compression operation. Each command may include respective descriptors associated with the operation such as the type of operation, source address, destination address, and transfer size, or pointers to the descriptors.

The neural network processor 402 can execute computations using a processing engine array 410, an activation engine 416, and/or a pooling engine 418. In various implementations, the memory subsystem 404 can include multiple memory banks 414. In these implementations, each memory bank 414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the neural network processor 402. For example, values can be simultaneously read and provided to each row of the processing engine array 410, so that the entire processing engine array 410 can be in use in one clock cycle. As another example, the memory banks 414 can be read at the same time that results computed by the processing engine array 410 are written to the memory subsystem 404. In contrast, a single memory may be able to service only one read or write at a time. With a single memory, multiple clock cycles can be required, for example, to read input data for each row of the processing engine array 410 before the processing engine array 410 can be started.

In various implementations, the memory subsystem 404 can be configured to simultaneously service multiple clients, including the processing engine array 410, the activation engine 416, the pooling engine 418, and any external clients that access the memory subsystem 404 over the chip interconnect 420. In some implementations, being able to service multiple clients can mean that the memory subsystem 404 has at least as many memory banks as there are clients. In some cases, each row of the processing engine array 410 can count as a separate client. In some cases, each column of the processing engine array 410 can output a result, such that each column can count as a separate write client. In some cases, output from the processing engine array 410 can be written into the memory banks 414 that can then subsequently provide input data for the processing engine array 410. As another example, the activation engine 416 and the pooling engine 418 can include multiple execution channels, each of which can be separate memory clients. The memory banks 414 can be implemented, for example, using static random access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the processing engine array 410, with one memory bank servicing each row. As another example, a set of memory banks can be hard wired to receive values from columns of the processing engine array 410, with one memory bank receiving data for each column.

The processing engine array 410 is the computation matrix of the example neural network processor 402. The processing engine array 410 can, for example, execute parallel integration, convolution, correlation, and/or matrix multiplication, among other things. The processing engine array 410 may include multiple processing engines 411, arranged in rows and columns, such that results output by one processing engine 411 can be input directly into another processing engine 411. Processing engines 411 that are not on the outside edges of the processing engine array 410 thus can receive data to operate on from other processing engines 411, rather than from the memory subsystem 404.

In various examples, the processing engine array 410 uses systolic execution, in which data arrives at each processing engine 411 from different directions at regular intervals. In some examples, input data can flow into the processing engine array 410 from the left and weight values can be loaded at the top. In some examples weights and input data can flow from the left and partial sums can flow from top to bottom. In these and other examples, a multiply-and-accumulate operation moves through the processing engine array 410 as a diagonal wave front, with data moving to the right and down across the array. Control signals can be input at the left at the same time as weights, and can flow across and down along with the computation.

In various implementations, the number of columns in the processing engine array 410 may determine the computational capacity of the processing engine array 410, and the number of rows may determine the required memory bandwidth for achieving maximum utilization of the processing engine array 410. The processing engine array 410 can have, for example, 64 columns and 128 rows, or some other number of columns and rows.

An example of a processing engine 411 is illustrated in FIG. 4 in an inset diagram. As illustrated by this example, a processing engine 411 can include a multiplier-accumulator circuit. Inputs from the left can include, for example, input data i and a weight value w, where the input data is a value taken from either a set of training input data or a set of intermediate results, and the weight value is from a set of weight values that connect one layer of the neural network to the next. For example, the layers of the neural network may include the NN layers 106*a*-106*d*, and the input data can be the ifmap 102 from FIG. 1A. The set of training input data can belong to, for example, an image being submitted for identification or object recognition, an audio clip being provided for speech recognition, or a string of text for natural language processing or machine translation. In some examples, the input data and the weight value are output to the right, for input to the next processing engine 411.

In the illustrated example, an input from above can include a partial sum, p_in, provided either from another processing engine 411 or from a previous round of computation by the processing engine array 410. When starting a computation for a new set of input data, the top row of the processing engine array 410 can receive a fixed value for p_in, such as zero. As illustrated by this example, i and w are multiplied together and the result is summed with p_in to produce a new partial sum, p_out, which can be input into another processing engine 411. Various other implementations of the processing engine 411 are possible.

Outputs from the last row in the processing engine array 410 can be temporarily stored in the results buffer 412. The results can be intermediate results, which can be written to the memory banks 414 to be provided to the processing engine array 410 for additional computation. Alternatively, the results can be final results, which, once written to the memory banks 414 can be read from the memory subsystem 404 over the chip interconnect 420 by the DMA controller 428.

In some implementations, the neural network processor 402 may include an activation engine 416. In these implementations, the activation engine 416 can combine the results from the processing engine array 410 into one or more output activations. For example, for a CNN, convolutions from multiple channels can be summed to produce an output activation for a single channel. In other examples, accumulating results from one or more columns in the processing engine array 410 may be needed to produce an output activation for a single node in the neural network. The activation engine 416 may perform a ReLu, Sigmoid, tanh, Leaky ReLu, Maxout, or another suitable activation function. As an example, the activation engine 416 may receive the convolution outputs from the results buffer 412 as an input, and output the convolution outputs directly if the convolution output has a positive value, or output a zero value. Thus, in certain examples, the output of a NN layer (e.g., fmaps) computed by the neural network processor 402 may include a high percentage of zeros after passing through the activation engine 416. Storing these zero values in the main memory 426 during the forward propagation operations to be re-used for the backward propagation operations can waste memory throughput during the training process. Therefore, certain embodiments can utilize the reduction engine 430 to remove the zero values before storing the fmaps in the main memory 426 computed by a forward pass, and restore the zero values in the fmaps before using them for a backward pass.

In some implementations, the neural network processor 402 can include a pooling engine 418. Pooling is the combining of outputs of the columns of the processing engine array 410. Combining can include, for example, computing a maximum value, a minimum value, an average value, a median value, a summation, a multiplication, or another logical or mathematical combination. In various examples, the pooling engine 418 can include multiple execution channels that can operate on values from corresponding columns of the processing engine array 410. In these examples, the pooling engine 418 may be able to perform between 1 and n parallel computations, where n is equal to the number of columns in the processing engine array 410. In various examples, execution channels of the pooling engine 418 can operate in parallel and/or simultaneously. In some examples, the pooling engine 418 can be bypassed.

The neural network processor 402 may receive the input data from the main memory 426 over the chip interconnect 420 via the DMA controller 428. The DMA controller 428 can obtain input data from an Input/Output (I/O) device, a storage drive, or a network interface coupled to the host system 422. The input data can be, for example one-dimensional data, such as a character string or numerical sequence, or two-dimensional data, such as an array of pixel values for an image or frequency and amplitude values over time for an audio signal. In some examples, the input data can be three-dimensional, as may be the case with, for example, the situational information used by a self-driving car or virtual reality data. In some implementations, the memory subsystem 404 can include a separate buffer for the input data. In some implementations, the input data can be stored in the memory banks 414 when the neural network processor 402 receives the input data.

The weights for the neural network can be stored in the memory subsystem 404, along with input data on which the neural network will operate. The neural network can also include instructions, which can program the processing engine array 410 to perform various computations on the weights and the input data. The instructions can also be stored in the memory subsystem 404, in the memory banks 414, or in a separate instruction buffer. The processing engine array 410 can output intermediate results, which may represent the outputs of the individual layers of the neural network, e.g., the NN layers 106a, 106b, 106c, or 106d in FIG. 1A. In some cases, the activation engine 416 and/or pooling engine 418 may be enabled for computations called for by certain layers of the neural network. The neural network processor 402 can store the intermediate results in the memory subsystem 404 to be fed back into the processing engine array 410 to compute results for the next layer of the neural network. The intermediate results output by each NN layer can also be read by the DMA controller 428 for processing by the reduction engine 430. For example, the intermediate results can include the fmap 108a, fmap 108b, or fmap 108c computed by the forward propagation operations in FIG. 1A, which can be read by the DMA controller 428 from the memory subsystem 404 and compressed (with or without transposing) using the reduction engine 430. The DMA controller 428 can further store the compressed data into the main memory 426 to be re-used for the backward propagation operations. The DMA controller 428 can read the compressed fmaps 108a, 108b, 108c, or the ofmap 104 from the main memory 426 to be processed by the reduction engine 420 for the backward propagation operations. For example, the reduction engine 420 can de-compress and transpose (if needed) the compressed fmaps for storing them in the memory subsystem 404 to be used by the neural network processor 402. The processing engine array 410 can further output final results of the training process of the neural network, which can be stored in the memory subsystem 404 to be copied to the main memory 426 or to another location.

Figure 5:
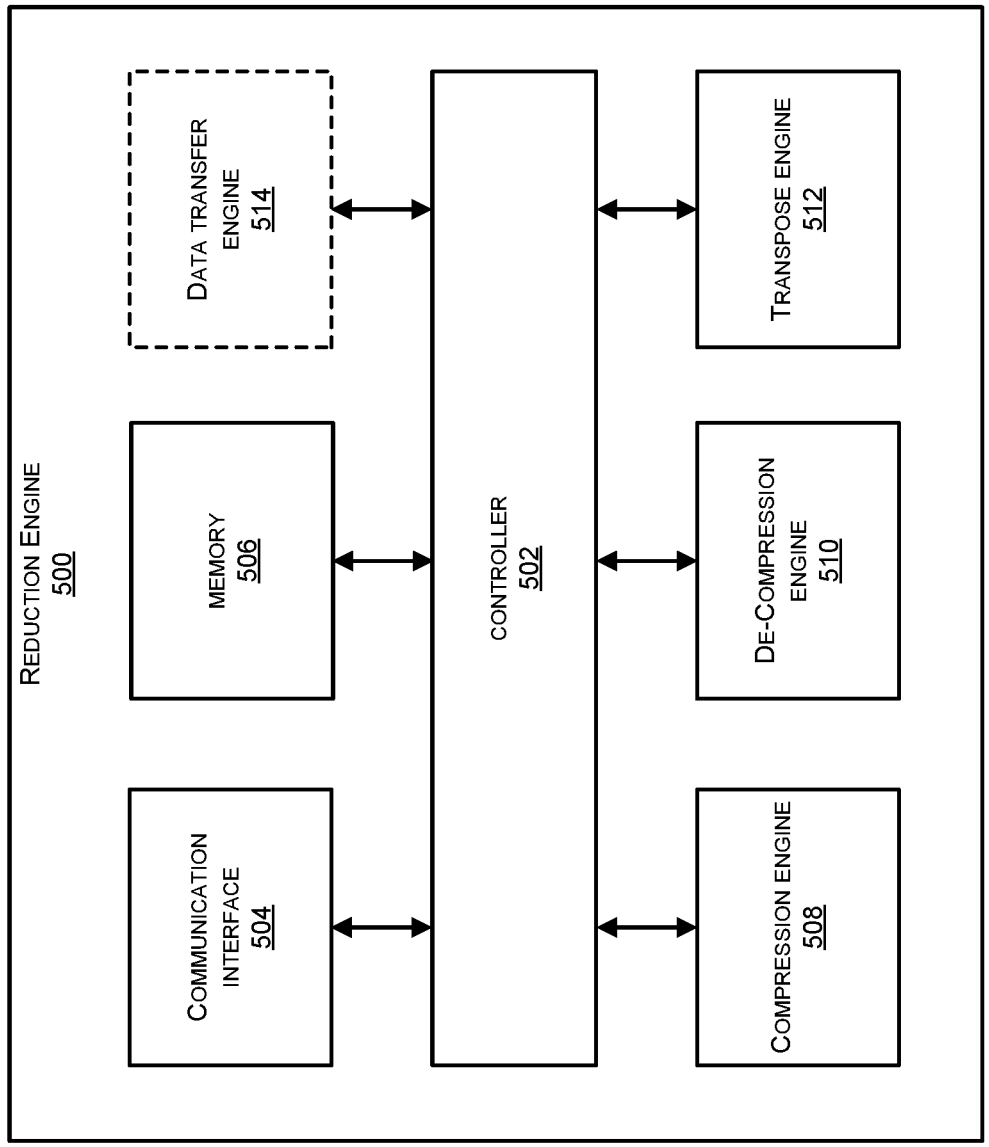
FIG. 5 illustrates components of an example reduction engine in certain embodiments.

FIG. 5 illustrates components of an example reduction engine 500 in certain embodiments. The reduction engine 500 may include a controller 502 coupled to a communication interface 504, a local memory 506, a compression engine 508, a de-compression engine 510, and a transpose engine 512.

In certain embodiments, the reduction engine 500 may be integrated with a DMA controller and include a data transfer engine 514. For example, the reduction engine 500 can be used as the DMA engine 432. In other embodiments, the reduction engine 500 may be similar to the reduction engine 430, and the data transfer engine 514 may be part of the DMA controller 428. The reduction engine 500 can be implemented as an integrated circuit, and may or may not be on the same die as the neural network processor 402. The memory 506 may be a volatile memory including an SRAM, DRAM, or SDRAM, among others.

The controller 502 may be configured to generate appropriate control signals to enable the data transfer engine 514, compression engine 508, de-compression engine 510, or the transpose engine 512 based on the commands. The commands may include different descriptors for different operations that can be part of the instructions provided by the host system 422. For example, the controller 520 may determine whether a first atomic operation or a second atomic operation is to be performed based on a command. As an example, a first command may include a descriptor for an atomic transpose and compression operation to be performed on the fmaps stored in the memory subsystems 404 from a forward pass of a training process. A second command may include a descriptor for a de-compression operation on the compressed fmaps stored in the main memory 426. A third command may include a descriptor for a compression operation to be performed on the fmaps stored in the memory subsystems 404 from a forward pass. A fourth command may include a descriptor for an atomic de-compression and transpose operation on the compressed fmaps stored in the main memory 426 for a backward pass. The commands may also include descriptors for data transfer between the memory subsystem 404 and the main memory 426, or between the host system 422 and the main memory 426. Each descriptor may include or point to a source address, a destination address, a transfer size, or configuration values, among others.

The communication interface 504 may be used to enable communication with the host system 422, main memory 426, memory subsystem 404, activation engine 416, or the pooling engine 418 via the chip interconnect 420 for transfer of data or instructions. The communication interface 504 may include appropriate bus interfaces, pins, connectors, or other suitable components based on the implementation.

The data transfer engine 514 may be used to enable data transfer between two memory locations based on a descriptor. The data transfer may be performed as a DMA operation. For example, the data transfer engine 514 may enable transfer of the fmaps computed by the forward propagation operations into the memory 506 from the memory subsystem 404 or the activation engine 416. The data transfer engine 514 may also enable transfer of the compressed fmaps for storing in the main memory 426 from the memory 506. The data transfer engine 514 may also enable transfer of the compressed fmaps stored in the main memory 426 to the memory 506 for de-compression. The data transfer engine 514 may also enable transfer of the de-compressed fmaps stored in the memory 506 to the memory subsystem 404 to be used for the backward propagation operations. The data transfer engine 514 may also be used for other DMA operations to transfer data or instructions between two memory locations internal or external to the apparatus 400.

The compression engine 508 may be used to perform a compression operation on given data. For example, the compression operation may be performed on the fmaps computed by the forward propagation operations, or the fmaps transposed by the transpose engine 512 as part of the atomic operation. Performing the compression operation may include removing zeros from the given data to generate compressed data, and storing the locations of the zeros in a compression header. The compressed data may be smaller in size based on the percentage of zeros in the given data. The compressed data (with or without transposition) and the compression header can be stored in the main memory 426 using the data transfer engine 514 and the communication interface 504.

The de-compression engine 510 may be used to perform a de-compression operation on the given data. For example, the de-compression operation may be performed on the compressed fmaps to generate decompressed data for the backward propagation operations. The compressed fmaps may be stored in the main memory 426. The compressed fmaps may include transposed and compressed fmaps, or just compressed fmaps (without transposition). Performing the de-compression operation may include restoring each removed data element back into the compressed data based on the information stored in the compression header. For example, the de-compression engine 510 may insert zeros back into the compressed data based on the location of the zeros stored in the compression header to generate de-compressed data. The de-compressed data can be read from the main memory 426 using the data transfer engine 514 and the communication interface 504, and stored in the memory 506 to be used by the de-compression engine 510. For fmaps that are stored transposed and compressed, the de-compression engine 510 may perform the de-compression operation on the transposed and compressed fmaps to generate the de-compressed data that can be stored in the memory subsystem 404 to be used by the neural network processor 402 for the backward propagation operations. For fmaps that are stored compressed but not transposed, the de-compression engine 510 may perform the de-compression operation on the compressed fmaps to generate the de-compressed data which can be stored in the memory 506 to be transposed by the transpose engine 512.

The transpose engine 512 may be used to perform a transpose operation on the given data. The given data may include the fmaps computed by the forward propagation operations or the de-compressed data that has been de-compressed by the de-compression engine 510 for the backward propagation operations. The transpose operation may include swapping the rows with columns of the given matrix. In some implementations, the transposed data may be stored in the memory 506 to be compressed by the compression engine 508. In some implementations, the transposed data may be transferred to the memory subsystem 404 to be used by the neural network processor 402 for the backward propagation operations.

Figure 6:
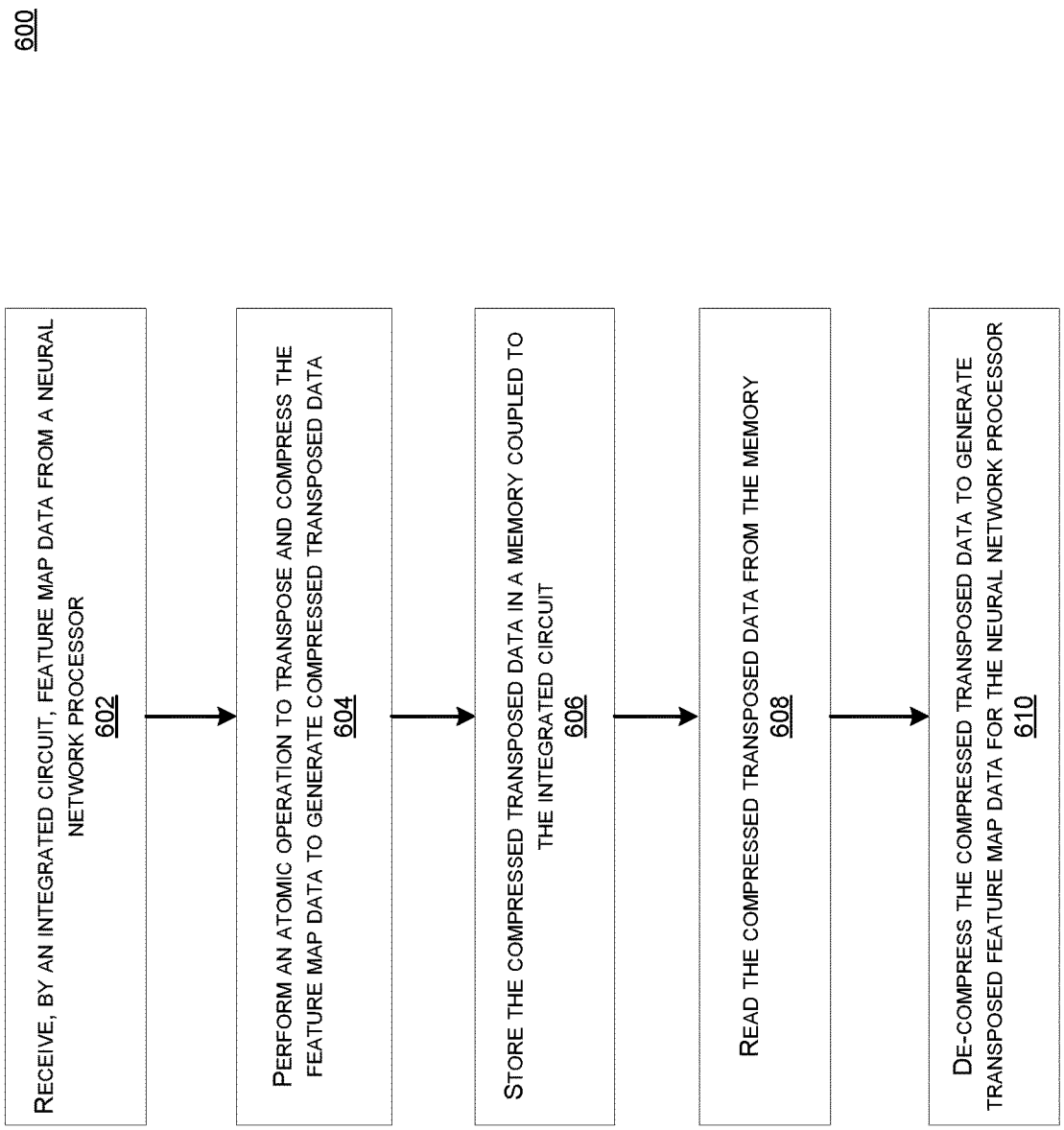
FIG. 6 illustrates a method which can be used for the training process of a neural network.

FIG. 6 illustrates a method 600 which can be used by a neural network. The method 600 may be performed by the reduction engine 430 with or without the DMA controller 428. The method 600 may be implemented as a computer-readable medium or computer program product comprising instructions which, when the program is executed by one or more computers, cause the one or more computers to carry out the steps of the method 600. For example, the one or more computers may include the apparatus 400. The instructions may include the first set of instructions generated by a compiler.

In step 602, an integrated circuit may receive feature map data from a neural network processor. The integrated circuit may include the reduction engine 430 as discussed with reference to FIGS. 4 and 5. The feature map data may include the fmap 108*a*, 108*b*, or 108*c* computed by the NN layer 106*a*, 106*b*, or 106*c*, respectively, for a respective forward propagation operation of a training process of a neural network, as discussed with reference to FIG. 1A. The feature map data may be computed by the neural network processor 402 in FIG. 4. For example, the convolution operations may be performed by the processing engine array 410 on the ifmap 102 using the filter 110*a* to compute intermediate results. The ifmap 102 can be part of the training input data. The activation engine 416 may perform an activation function (e.g., ReLu) on the intermediate results to generate the fmap 108*a*. As a result of the activation function, the fmap 108*a* may include elements having a zero value. The fmap 108*a* may be stored in the memory subsystem 404 and/or transferred to the reduction engine 420 by the DMA controller 428. As an example, the fmap 108*a* may be similar to the fmap 302 in FIG. 3A.

In step 604, the integrated circuit may perform an atomic operation to transpose and compress the feature map data to generate compressed transposed data. As an example, the reduction engine 430 may receive a command comprising a descriptor for an operation. The command may be part of an instruction received by the reduction engine 430 from the host system 422 using the communication interface 504. The command may provide memory descriptors to the reduction engine 430 which can enable the controller 502 to generate appropriate controls signals for different components of the reduction engine 500. For example, first, the transpose engine 512 may perform a transpose operation on the fmap 108*a* to generate the transposed data. The transposed data may be similar to the transposed data 304 in FIG. 3A.

The transposed data may be stored in the memory 506. Next, the compression engine 508 may perform a compression operation on the transposed data read from the memory 506 to generate the compressed transposed data. As an example, the compressed transposed data may be similar to the compressed transposed data 306 in FIG. 3A. The compression operation may include removing zeros from the transposed data. The compression engine 508 may also store information indicating locations of those zeros in the transposed data in a compression header as part of the compression operation. The compression header may be in the form of a bit map, for example, similar to the bit map 308 in FIG. 3A.

In step 606, the integrated circuit may store the compressed transposed data in a memory coupled to the integrated circuit. For example, the reduction engine 430 may store the compressed transposed data in the main memory 426. The reduction engine 430 may also store the compression header along with the compressed transposed data in the main memory 426. In certain embodiments, the data transfer engine 514 may transfer the compressed transposed data and the compression header from the memory 506 to the main memory 426 via the chip interconnect 420. Note that in certain implementations, the data transfer engine 514 can be part of the DMA controller 428.

In step 608, the integrated circuit may read the compressed transposed data from the memory. The compressed transposed data may be read from the main memory 426 by the data transfer engine 514 and stored in the memory 506. The data transfer engine 514 may also read the compression header along with the compressed transposed data from the main memory 426 via the chip interconnect 420 and store in the memory 506.

In step 610, the integrated circuit may de-compress the compressed transposed data to generate transposed feature map data for the neural network processor. The de-compression engine 510 may perform a de-compression operation on the compressed transposed data read from the memory 506 to generate the transposed feature map data which can be used by the neural network processor 402 for a backward propagation operation of the training process. The de-compression operation may include restoring each removed data element in the transposed feature map data based on the information stored in the compression header. For example, the de-compression engine 510 may generate the transposed feature map data by inserting zeros back into the transposed feature map data based on the stored locations of those zeros from the compression header. As an example, the transposed feature map data may be similar to the de-compressed transposed fmap 310 in FIG. 3A. The transposed feature map data may be fed to the NN layer 106*a* as the fmap 108*a* in FIG. 1B for the backward pass.

Figure 7:
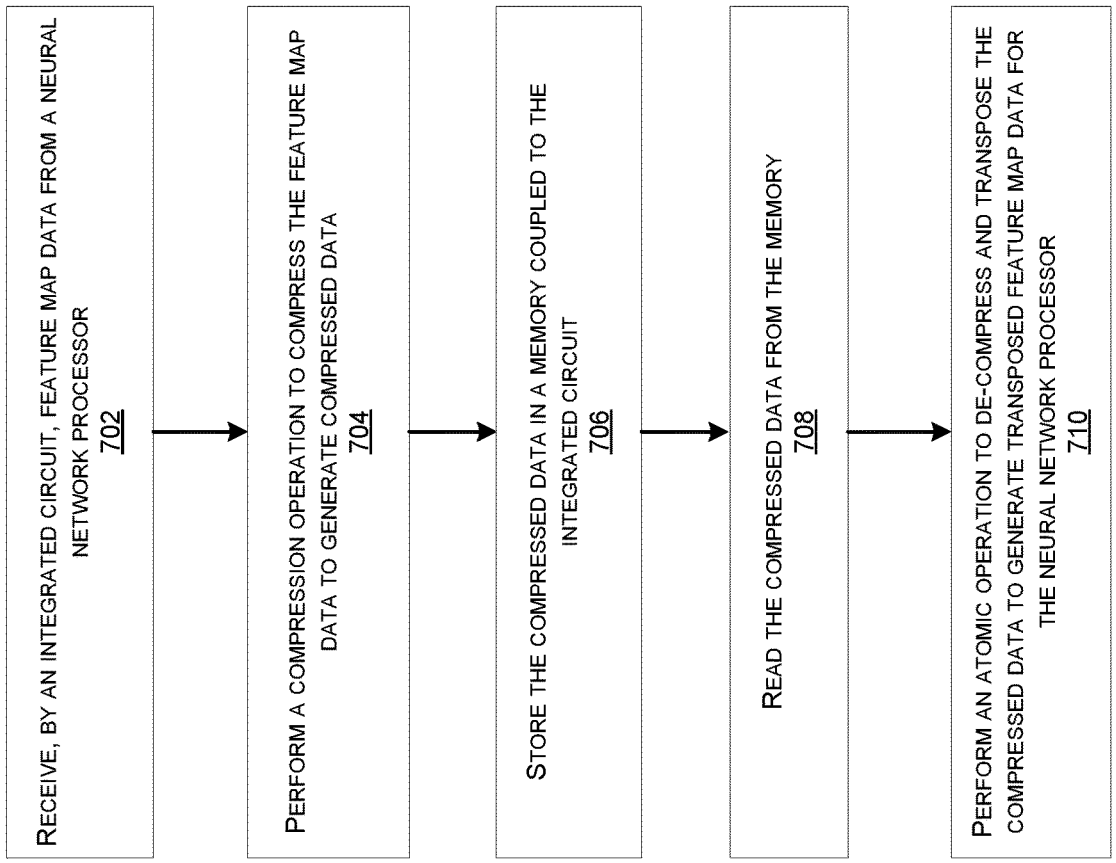
FIG. 7 illustrates another method which can be used for the training process of a neural network.

FIG. 7 illustrates another method 700 which can be used for a neural network. The method 700 may be performed by the reduction engine 430 with or without the DMA controller 428. The method 700 may be implemented as a computer-readable medium or computer program product comprising instructions which, when the program is executed by one or more computers, cause the one or more computers to carry out the steps of the method 700. For example, the one or more computers may include the apparatus 400. The instructions may include the second set of instructions generated by a compiler.

In step 702, an integrated circuit may receive feature map data from a neural network processor. The integrated circuit may include the reduction engine 430 as discussed with reference to FIGS. 4 and 5. The step 702 may be the same as the step 602 described with reference to the method 600. The feature map data may be similar to the fmap 108*a* computed by the NN layer 106*a* for a forward propagation operation of a training process of a neural network, as discussed with reference to FIG. 1A.

In step 704, the integrated circuit may perform a compression operation to compress the feature map data to generate compressed data. As an example, the reduction engine 430 may receive a command comprising a descriptor for an operation. The command may be part of an instruction received from the host system 422. The controller 502 can enable the compression engine 508 to compress the feature map data based on the descriptor. An example feature map data can be similar to the fmap 302 and the compressed data may be similar to the compressed data 312 in FIG. 3B. The compression operation may include removing zeros from the feature map data. The compression engine 508 may also store information indicating locations of those zeros from the feature map data in a compression header as part of the compression operation. The compression header may be in the form of a bit map, for example, similar to the bit map 308, in FIG. 3B.

In step 706, the integrated circuit may store the compressed data in a memory coupled to the integrated circuit. For example, the reduction engine 430 may store the compressed data in the main memory 426. The reduction engine 430 may also store the compression header along with the compressed data in the main memory 426. In certain embodiments, the data transfer engine 514 may transfer the compressed data and the compression header from the memory 506 to the main memory 426 via the chip interconnect 420. Note that in certain implementations, the data transfer engine 514 can be part of the DMA controller 428.

In a step 708, the integrated circuit may read the compressed data from the memory. The compressed data may be read from the main memory 426 by the data transfer engine 514 and stored in the memory 506. The data transfer engine 514 may also read the compression header along with the compressed data from the main memory 426 via the chip interconnect 420 and store the compression header and the compressed data in the memory 506.

In step 710, the integrated circuit may perform an atomic operation to de-compress and transpose the compressed data to generate transposed feature map data for the neural network processor. As an example, the reduction engine 430 may receive a command comprising a descriptor for the atomic operation. The command may be part of an instruction received from the host system 422. The controller 502 can first enable the de-compression engine 510 engine to perform a de-compression operation on the compressed data by inserting zeros based on the information stored in the compression header to generate the de-compressed data. The de-compressed data may be similar to the de-compressed data 312 in FIG. 3B. The de-compressed data may be stored in the memory 506. Next, the controller 502 can enable the transpose engine 510 to perform a transpose operation on the de-compressed data to generate the transposed de-compressed data. As an example, the transposed de-compressed data may be similar to the transposed de-compressed fmap 312 in FIG. 3B. The de-compression operation may include inserting zeros back into the transposed de-compressed data based on the stored locations of zeros from the compression header. The transposed de-compressed data may be fed to the NN layer 106a as the fmap 108a in FIG. 1B for a backward propagation operation of the training process.

The amount of throughput savings may depend upon the compression rate (CR), which may equate to a ratio between the compressed data and original uncompressed data. The throughput savings (for example, 1/CR) may increase as the percentage of elements with a zero value increase in the original data.

Although the description above have described the compression, decompression, and transpose operations in the context of training a neural network, it should be understood that these operations can also be performed in other contexts. For example, an atomic operation to compress and transpose a matrix can be performed during an inference operation or other types of neural network computation if transposition is required. Similarly, an atomic operation to decompress and transpose a matrix can be performed during an inference operation or other types of neural network computation if such transposition is required.

Figure 8:
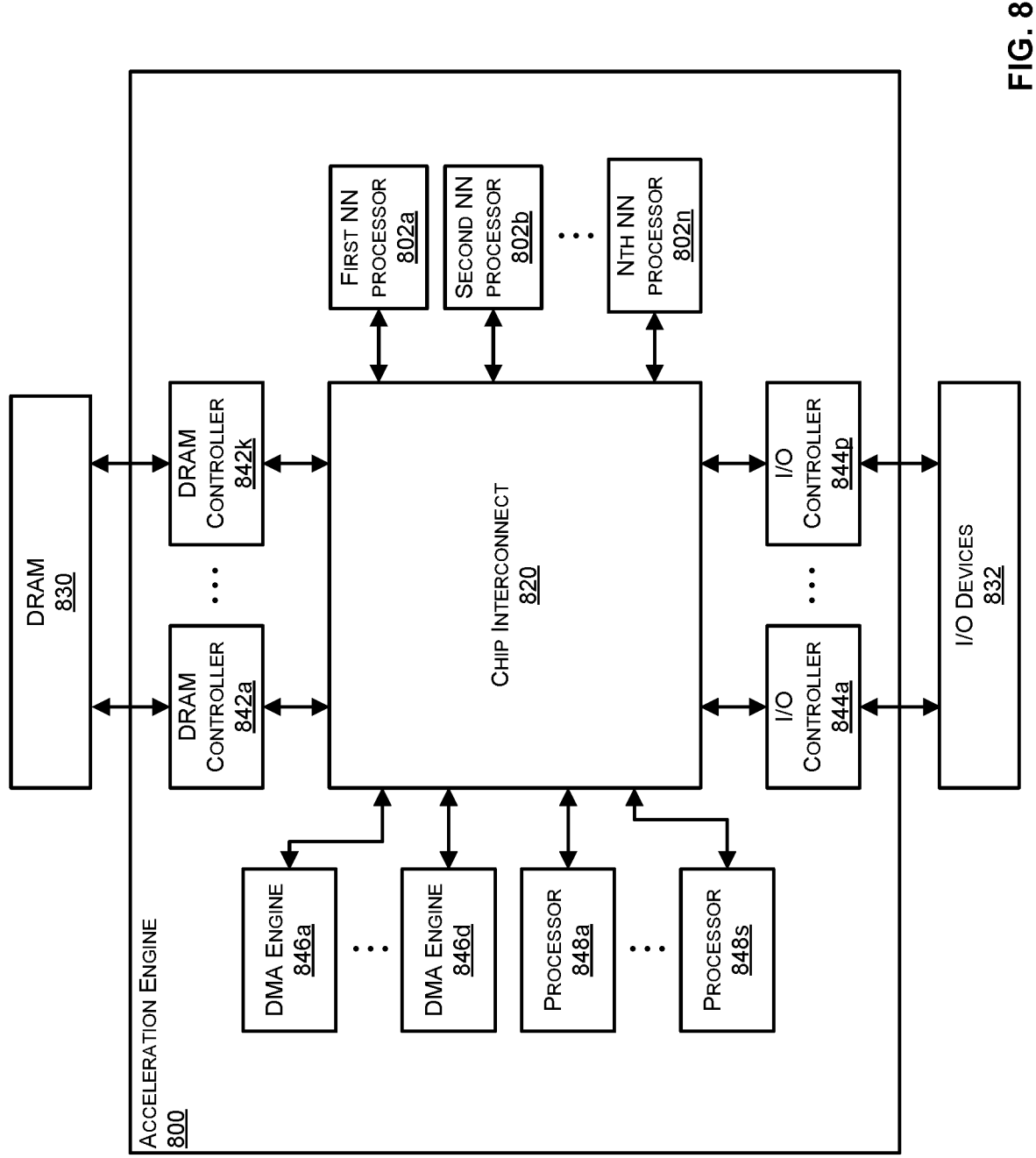
FIG. 8 illustrates an example of an acceleration engine.

FIG. 8 illustrates an example of an acceleration engine 800. The acceleration engine 800 is an example of an integrated circuit that can include one or more NN processors 802a-802n that may be similar to the NN processor 402 illustrated in FIG. 4.

In the example of FIG. 8, the acceleration engine 800 includes multiple NN processors 802a-802n, each of which can perform a set of operations. In various examples, the NN processors 802a-802n are for particular types of operations, so that the NN processors 802a-802n can perform the operations much faster than when similar operations are performed by a general purpose processor. In various examples, to perform a set of operations, input data on which the operations are to be performed must first be moved into the NN processors 802a-802n. Additionally, in some cases, program code is also moved into the NN processors 802a-802n, which programs the operations that the NN processors 802a-802n will perform on the data. In the illustrated example, the acceleration engine 800 includes n NN processors 802a-802n. Examples of NN processors that can be included in the acceleration engine 800 include graphics accelerators, floating point accelerators, neural network accelerators, and others. In various examples, the NN processors 802a-802n can each be the same (e.g., each of the NN processors 802a-802n is a graphics accelerator) or can be different (e.g., the NN processors 802a-802n include a graphics accelerator, a floating point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of RAM technology can be used for the external memory. The DRAM controllers 842a-842k can also be referred to as memory controllers.

In various examples, input data and/or program code for the NN processors 802a-802n can be stored in the DRAM 830. Different programs can cause the NN processors 802a-802n to perform different operations. For example, when one of the NN processors is a neural network accelerator, one program can configure the neural network accelerator to perform speech recognition while another program can configure the neural network accelerator to perform image recognition. In various examples, different NN processors 802a-802n can be programmed with different programs, so that each performs a different set of operations. In various examples, the processors 848a-848s can manage moving of program code from the DRAM 830 to the NN processors 802a-802n.

The example acceleration engine 800 further includes I/O controllers 844a-844p for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844p can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes p I/O controllers 844a-844p, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848a-848s, which can also be referred to as data management processors. In the example of FIG. 8, the acceleration engine 800 includes s processors 848a-848s incorporated into the device (e.g., on the same silicon die). In other examples, the processors 848a-848s can be external to the acceleration engine 800 (e.g., on a different die and/or in a different package). In some examples, the processors 848a-848s can manage the movement of data from I/O devices 832 to the NN processors 802a-802n or the DRAM 830. For example, input data may be located at an I/O device 832 or in processor memory, and the processors 848a-848s can move the input from the I/O device 832 or processor memory into a NN processor or into DRAM 830. As another example, program code for the NN processors 802a-802n may be located on an I/O device 832 or in processor memory.

The example acceleration engine 800 further includes DMA engines 846a-846d that can move data between the NN processors 802a-802n, DRAM controllers 842a-842k, and I/O controllers 844a-844p. In the illustrated example, the acceleration engine 800 includes d DMA engines 846a-846d. In some implementations, the DMA engines 846a-846d can be assigned to specific tasks, such as moving data from the DRAM controllers 842a-842d to the NN processors 802a-802n, or moving data between the I/O controllers 844a-844p and the NN processors 802a-802n. These tasks can be assigned, for example, by enqueueing descriptors with the DMA engines 846a-846d, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to a NN processor. Further descriptors can be used to move data from a NN processor to DRAM 830.

In certain embodiments, each DMA engine 846a-846d may include a respective reduction engine similar to the reduction engine 430 described with reference to previous figures. The DMA engines 846a-846d may be capable to perform the first atomic operation and the second atomic operation based on the appropriate descriptors in addition to performing the DMA transfers.

In various examples, each of the processors 848a-848s can be responsible for managing the data movement for a different NN processor. In some examples, a processor may manage the data movement for more than one NN processor. Similarly, in various examples, each of the processors 848a-848s can be assigned to one or more DMA engines 846a-846d. In these and other examples, associations between processors 848a-848s, NN processors 802a-802n, and DMA engines 846a-846d are determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexors to control the direction of data, flip-flops for handling clock domain crossings, and timing logic.

Figure 9:
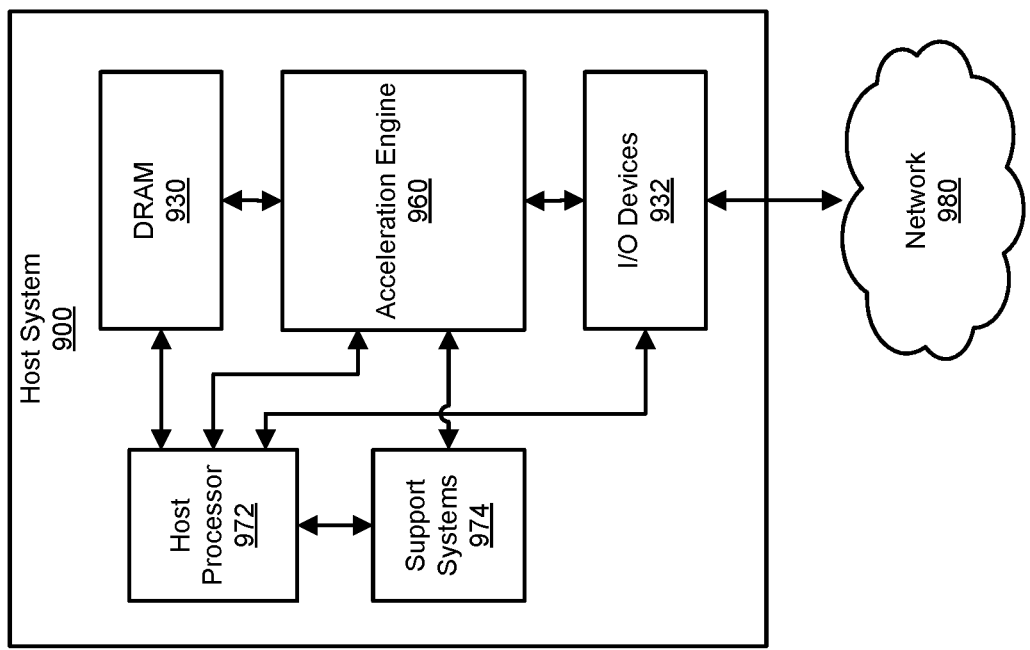
FIG. 9 illustrates an example of a host system.

FIG. 9 illustrates an example of a host system 900 in which an acceleration engine 960 can be used. The acceleration engine 960 of FIG. 9 is similar to the acceleration engine 800 as is illustrated in FIG. 8. The example host system 900 of FIG. 9 includes the acceleration engine 960, a host processor 972, DRAM 930 or processor memory, I/O devices 932, and support systems 974. In various implementations, the host system 900 can include other hardware that is not illustrated here. In certain implementations, the host processor 972 is similar to the host processor 422 and the DRAM 930 includes the main memory 426.

The host processor 972 is a general purpose integrated circuit that is capable of executing program instructions. In some examples, the host processor 972 can include multiple processing cores. A multi-core processor may include multiple processing units within the same processor. In some examples, the host system 900 can include more than one host processor 972. In some examples, the host processor 972 and the acceleration engine 960 can be one chip, such as, one or more integrated circuits within the same package.

In various examples, the host processor 972 can communicate with other components in the host system 900 over one or more communication channels. For example, the host system 900 can include a host processor bus, which the host processor 972 can use to communicate with the DRAM 930. As another example, the host system 900 can include an I/O bus, such as a PCI-based bus, over which the host processor 972 can communicate with the acceleration engine 960 and/or the I/O devices 932. In various examples, the host system 900 can, alternatively or additionally, include other communication channels or busses, such as serial busses, power management busses, storage device busses, and so on.

In some examples, software programs executing on the host processor 972 can receive or generate input for processing by the acceleration engine 960. In some examples, the programs can select an appropriate neural network to execute for a given input. For example, a program may be for language translation, and can select one or more neural networks for a training process to perform speech recognition and/or machine translation. In these and other examples, the programs can configure the acceleration engine 960 with the neural network to train. In some examples, the host processor 972 can manage the movement of data (such as weights, instructions, intermediate results, results of conditional layers, and/or final results) into or out of the acceleration engine 960 for the training process.

In some examples, a software program that is using the acceleration engine 960 to perform the training process can read the result from a conditional layer from the acceleration engine 960 and/or from a storage location, such as in DRAM 930. In these examples, the program can determine what action the neural network should take next. For example, the program can determine to terminate the training process. As another example, the program can determine to change the direction of the training process, which can be translated by lower level code and/or the neural network processor to a next layer to execute. In these and other examples, the execution flow of the neural network can be coordinated by software.

The DRAM 930 is memory that is used by the host processor 972 for storage of program code that the host processor 972 is in the process of executing, as well as values that are being operated on. In some examples, the data for a neural network (e.g., weight values, instructions, compressed feature map data, compression header, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a Read-Only Memory (ROM) that stores boot code for booting the host system 900 at power on, and/or Basic Input/Output System (BIOS) code.

Though not illustrated here, the DRAM 930 can store instructions for various programs, which can be loaded into and be executed by the host processor 972. For example, the DRAM 930 can be storing instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controlling peripheral devices, among other operations. In some examples, a host system 900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers.

Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system, and/or application programs and peripheral devices accessible to the host system 900. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices. The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device. In various implementations, the support systems 974 can include hardware for coordinating the operations of the acceleration engine 960. For example, the support systems 974 can include a microprocessor that coordinates the activities of the acceleration engine 960, including moving data around on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 972. In some examples, the program executed by the microprocessor is stored on the hardware of microprocessor, or on a non-volatile memory chip in the host system 900. In some examples, the microprocessor and the acceleration engine 960 can be on chip, such as one integrated circuit on the same die and in the same package. In certain examples, the DRAM 930 may store instructions generated by a compiler to implement certain features disclosed herein. The instructions may be executed by the acceleration engine 960 or the microprocessor.

In some examples, the support systems 974 can be responsible for taking instructions from the host processor 972 when programs executing on the host processor 972 request the execution of a neural network. For example, the host processor 972 can provide the support systems 974 with a set of training input data and a task that is to be performed on the set of training input data. In this example, the support systems 974 can identify a neural network that can be trained to perform the task, and can program the acceleration engine 960 to train the neural network using the set of training input data. In some examples, the support systems 974 only needs to select an appropriate neural network processing engine of the neural network processor. In some examples, the support systems 974 may need to load the data for the neural network onto the acceleration engine 960 before the acceleration engine 960 can start training the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 10:
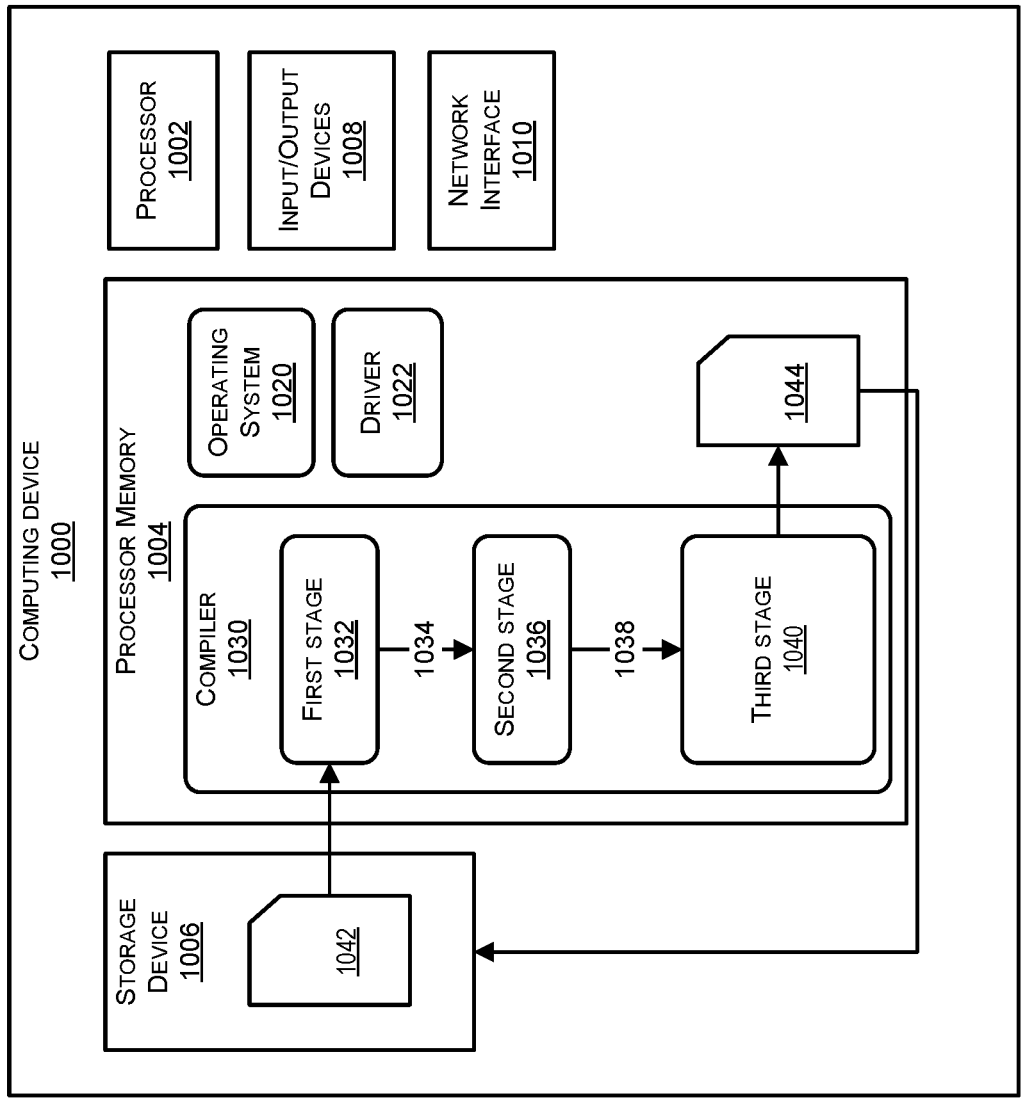
FIG. 10 illustrates an example of a computing device.

FIG. 10 includes a block diagram illustrating an example of a computing device 1000 on which a compiler 1030, such as is described herein, can run. The illustrated computing device may include a processor 1002, a processor memory 1004, at least one storage device 1006, various Input/Output (I/O) devices 1008, and at least one network interface 1010. In various examples, the computing device 1000 can be implemented as a server in a data center, a desktop computer, a laptop computer, a tablet computer, or a smartphone. In some examples, operations or components discussed below as performed or included in the computing device 1000 can be performed or included in other computer devices. In certain examples, certain components of the computing device 1000 (e.g., the compiler 1030) can be part of the host system 900 to enable the host system 900 to generate the compiled code to be used to train a neural network model.

The processor 1002 is an integrated circuit device that can execute program code, in the form of instructions. The program code can be for various software applications or tools, such as an operating system 1020 or the illustrated compiler 1030. While the processor 1002 is executing a program, the instructions for the program can be stored in the processor memory 1004 using a non-transitory computer-readable medium. The instructions can also be stored elsewhere, such as on the storage device 1006, and can be loaded into the processor memory 1004 when needed by the processor 1002. The processor 1002 can also use the processor memory 1004 for temporary storage of other data on which the processor 1002 is operating. In various examples, the processor memory 1004 is a volatile memory type, such as a type of RAM, though non-volatile memory types can, alternatively or additionally, be used for the processor memory 1004.

The storage device 1006 is an example of a device that can include non-volatile memory. For example, the storage device 1006 can be a magnetic disk drive, a solid state drive, or an optical drive. The storage device 1006 can further be non-transitory, such that program code and other data stored on the storage device 1006 remains present when the storage device 1006 is not powered on.

The storage device 1006 is one example of a peripheral device, which are components that can be coupled to the computing device 1000 to add functionality to the computing device 1000. Other examples of peripheral devices include the Input/Output devices 1008 and the network interface 1010. The Input/Output devices 1008 can include user input and output devices, such as keyboards, mice, touch screens, microphones, display screens, speakers, printers, and scanners. The network interface 1010, which can be implemented using a network interface card, can provide access to one or more networks. The network interface 1010 can include, for example, a physical port for connecting a network cable and/or wireless antennas for communicating with Wi-Fi and/or cellular networks. The network interface 1010 can also be described as an I/O device.

In various examples, the computing device 1000 can execute the compiler 1030 to generate program code which can be executed by an acceleration engine such as the acceleration engine 800 or the acceleration engine 960. For example, the program code generated by the compiler 1030 can be stored in the DRAM 930. Compilers, in general, are software programs that translate program code written in a human-readable language into a format (e.g., machine instructions) that can be read and processed by an integrated circuit device. The compiler 1030 can be activated, for example, when the operating system 1020 receives keyboard, mouse, touchscreen, voice commands, or other inputs from the Input/Output devices 1008. The inputs can further include parameters for the compiler 1030, such as the input code 1042 to compile and configuration options for the compilation process. In certain examples, the configuration options may include a configuration parameter to enable the compiler 1030 to generate a first set of instructions or a second set of instructions for execution by the reduction engine 430, as discussed with reference to FIG. 4. Once the compiler 1030 is activated, the processor 1002 can load the instructions for the compiler 1030 into the processor memory 1004, and can execute the instructions.

In the example of FIG. 10, the compiler 1030 includes a first stage 1032, a second stage 1036, and a third stage 1040, which each perform different operations to produce compiled code 1044. In other examples, the compiler 1030 can combine the operations of the first stage 1032, second stage 1036, and/or third stage 1040 into fewer stages, or can divide the operations of one of the stages into multiple stages.

The first stage 1032 can receive and process input code 1042. The input code 1042 can describe a program in a high-level programming language, such as Java, C++, or TensorFlow. The input code 1042 can describe, for example, steps to perform various operations related to a training process of a neural network model for a neural network. The neural network model can be trained to perform image recognition, speech synthesis, speech recognition, machine translation, or other tasks. The input code 1042 can be obtained, for example, from the storage device 1006. Alternatively, though not illustrated here, the input code 1042 may be located in the processor memory 1004 or can be obtained from a network location, using the network interface 1010. Processing of the input code 1042 can include sorting the operations described in the input code 1042 into layers, where the outputs of one layer provide the inputs to a next layer. Processing can also include identifying steps to be performed by the processor 1002.

The output 1034 of the first stage 1032 can be organized, for example, in the layers, nodes, and connections between nodes of a neural network. The second stage 1036 can perform intermediate processing on this output 1034. For example, the operations performed in any one layer, or at any one node in a layer, may be too many for the acceleration engine 960 to perform at the same time. The acceleration engine 960 may, for example, have a limited amount of locale storage space for the data needed for a computation, or the computations may be more than the acceleration engine 960 can perform at one time. In this example, the first stage 1032 can break the operations of the layer or node down into smaller operations, which can fit into the acceleration engine 960's local memory and/or can fit into the computing capacity of the acceleration engine 960. Processing of the output 1034 of the first stage 1032 can include other steps, such as scheduling, or determining the order in which the acceleration engine 960 and/or the host processor 972 will perform operations, among other examples.

In various examples, the output 1038 of the second stage 1036 includes the various steps to be performed by components of the acceleration engine 960, in the order that the steps are to be performed. The output 1038 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 1040 can operate on the output 1038 of the second stage 1036, and perform various steps before producing the instructions that are to be executed by the acceleration engine 960. These steps can include, for example, removing redundant dependencies, resolving or handling dependencies between nodes by inserting synchronization instructions into the code, identifying possibly optimizations in memory usage or memory bandwidth usage, and other operations.

The output of the third stage 1040 is compiled code 1044, which may include machine instructions in binary format. The compiled code 1044 may include instructions that can be executed by certain components of the acceleration engine 960 including the neural network processor 402, reduction engine 430 or the DMA controller 428. For example, the instructions may include instructions to perform a convolution operation, transpose operation, compression operation, de-compression operation, first atomic operation, second atomic operation, or a DMA operation among others. In some examples, the compiled code 1044 can be stored in the processor memory 1004. Alternatively or additionally, the compiled code 1044 can be copied to the storage device 1006 or to a network location. As noted above, the compiled code 1044 can be sent over the network interface 1010 to a host system such as the host system 900 or the host system 422.

In the example of FIG. 10, the computing device 1000 can be executing a driver 1022, which can also be referred to as a device driver or runtime driver, that manages an Input/Output device 1008 or the host system 900. The driver 1022 can provide an interface between applications executing on the computing device 1000 and the host system 900. In certain examples, the driver 1022 can provide an Application Program Interface (API) that defines functions for feeding the compiled code 1044 into to the host system 900 for training a neural network model using the acceleration engine 960. For example, the driver 1022 can identify a neural network that the acceleration engine 960 is to execute, as well as the location in the processor memory 1004 or on the storage device 1006 where the compiled code 1044 for the neural network is located. The driver 1022 can further load into the host system 900 or cause the host system 900 to load the compiled code 1044. In certain examples, the compiled code 1044 can be loaded into the DRAM 930.

In certain examples, the computing device 1000 can be one of the nodes on a network that includes multiple nodes. The multiple nodes in the network may include other host systems or computing devices. One or more computing devices may include a memory for storing program instructions, a processor for executing the instructions, and a network interface for connecting to the network. For example, the network can be used to process data. The input data can be received at one of the nodes or from other networks with which the network can communicate. In this example, the input data can be directed to a node in the network that includes an acceleration engine (e.g., similar to the acceleration engine 960), for the acceleration engine to operate on and produce a result. The result can then be transferred to the node or other network from which the input data was received. In various examples, the input data can be accumulated from various sources, including one or more of the nodes and/or computing devices located in the other networks, and the accumulated input data can be directed to one or more host systems in the network. Results from the host systems can then be distributed back to the sources from which the input data was gathered.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIGS. 8-10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
a neural network processor configured to perform training on a neural network model by generating feature map data during a forward pass, and updating weight values using the feature map data during a backward pass; and
reduction engine circuitry configured to:
  receive the feature map data generated during the forward pass; and
  process the feature map data by:
    transposing the feature map data to generate transposed data,
    wherein transposing the feature map data includes swapping rows and columns of the feature map data;
    after transposing the feature map data to generate the transposed data, compressing the transposed data to generate compressed transposed data;

storing the compressed transposed data in a main memory;
reading the compressed transposed data from the main memory for the backward pass; and
de-compressing the compressed transposed data to generate transposed feature map data to be used in the backward pass.

2. The computing system of claim 1, wherein the reduction engine circuitry is further configured to store, in the main memory, information indicating locations of zero values in the feature map data or the transposed data.

3. The computing system of claim 1, wherein the feature map data is generated by performing convolution operations on a training data set followed by an activation function.

4. The computing system of claim 1, wherein the reduction engine circuitry is part of a direct memory access (DMA) engine.

5. A method comprising:
receiving, by an integrated circuit, feature map data from a neural network processor;
transposing, by the integrated circuit, the feature map data to generate transposed data, wherein transposing the feature map data includes swapping rows and columns of the feature map data;
after transposing the feature map data to generate the transposed data, compressing, by the integrated circuit, the feature map data to generate compressed transposed data;
storing, by the integrated circuit, the compressed transposed data in a memory coupled to the integrated circuit;
reading, by the integrated circuit, the compressed transposed data from the memory; and
de-compressing, by the integrated circuit, the compressed transposed data to generate transposed feature map data for the neural network processor.

6. The method of claim 5, wherein transposing the feature map data and compressing the transposed data are performed as part of an atomic operation without storing the transposed data in the memory.

7. The method of claim 6, wherein the feature map data comprises data elements, and compressing the transposed data includes removing each data element having a zero value in the transposed data.

8. The method of claim 7, further comprising:
storing, by the integrated circuit, a compression header along with the compressed transposed data in the memory, wherein the compression header includes information indicating a respective location for each data element having a zero value in the transposed data.

9. The method of claim 8, wherein de-compressing includes restoring each removed data element in the transposed feature map data based on the compression header.

10. The method of claim 8, wherein the compression header is stored as a bit map in the memory.

11. The method of claim 6, wherein the atomic operation is performed based on a command, the command received from a host system also coupled to the integrated circuit via a chip interconnect, wherein the command includes a single descriptor for the atomic operation.

12. The method of claim 5, wherein the feature map data is computed by the neural network processor by performing convolution operations on a training data set followed by an activation function, wherein the neural network processor is also coupled to the integrated circuit.

13. The method of claim 5, wherein the feature map data is computed by the neural network processor by performing a forward propagation operation of a training process of a neural network model, the method further comprising:
providing, by the integrated circuit, the transposed feature map data to the neural network processor for a backward propagation operation of the training process of the neural network model.

14. An apparatus comprising:
a neural network processor configured to perform convolution operations to generate feature map data using a neural network model;
a memory; and
an integrated circuit configured to:
transpose the feature map data to generate transposed data, wherein transposing the feature map data includes swapping rows and columns of the feature map data;
after transposing the feature map data to generate the transposed data, compress the transposed data to generate compressed transposed data;
store the compressed transposed data in the memory; and
perform a de-compression operation to de-compress the compressed transposed data to generate transposed feature map data for the neural network processor.

15. The apparatus of claim 14, wherein the neural network processor performs the convolution operations on input data and weights to generate the feature map data for a forward pass of a training process of the neural network model, the neural network processor further configured to adjust the weights for a backward pass of the training process using the transposed feature map data.

16. A non-transitory computer-readable medium having stored therein instructions that, when executed by one or more processors cause the one or more processors to execute a compiler, the compiler performing operations including:
generating an instruction for a neural network processor to:
perform convolution operations to generate feature map data using a neural network model; and
generating a set of instructions for an integrated circuit to:
transpose the feature map data to generate transposed data, wherein transposing the feature map data includes swapping rows and columns of the feature map data;
after transposing the feature map data to generate the transposed data, compress the transposed data to generate compressed transposed data; and
perform a de-compression operation on the compressed transposed data to generate transposed feature map data.

17. The non-transitory computer-readable medium of claim 16, wherein the neural network processor generates the feature map data for a forward pass of a training process of the neural network model, the feature map data comprising data elements, wherein
the set of instructions include additional instructions for the integrated circuit to:
generate a compression header based on a respective location of each data element having a zero value in the transposed data;
store the compression header along with the compressed transposed data in a memory coupled to the integrated circuit; and
read the compression header and the compressed transposed data from the memory for a backward pass of the training process.

18. The non-transitory computer-readable medium of claim 16, wherein the set of instructions include a descriptor for an atomic operation that transposes the feature map data and compresses the transposed data.

* * * * *